(12) United States Patent
Ueda

(10) Patent No.: US 8,930,485 B2
(45) Date of Patent: Jan. 6, 2015

(54) INFORMATION PROCESSING APPARATUS AND NON-TRANSITORY COMPUTER-READABLE RECORDING MEDIUM HAVING PROGRAM STORED THEREON

(75) Inventor: Akihiro Ueda, Kawasaki (JP)

(73) Assignee: Fujitsu Limted, Kawasaki (JP)

( * ) Notice: Subject to any disclaimer, the term of this patent is extended or adjusted under 35 U.S.C. 154(b) by 158 days.

(21) Appl. No.: 13/589,204

(22) Filed: Aug. 20, 2012

(65) Prior Publication Data

US 2013/0080569 A1    Mar. 28, 2013

(30) Foreign Application Priority Data

Sep. 22, 2011    (JP) .................. 2011-207644

(51) Int. Cl.
| | |
|---|---|
| G06F 15/167 | (2006.01) |
| G06F 13/00 | (2006.01) |
| G06F 11/20 | (2006.01) |
| G06F 3/06 | (2006.01) |

(52) U.S. Cl.
CPC ............ *G06F 13/00* (2013.01); *G06F 11/2074* (2013.01); *G06F 11/2076* (2013.01); *G06F 3/0689* (2013.01)
USPC ........................................................ 709/216

(58) Field of Classification Search
USPC ........................................ 709/212, 213, 216
See application file for complete search history.

(56) References Cited

U.S. PATENT DOCUMENTS

| | | | |
|---|---|---|---|
| 7,472,240 B2 | 12/2008 | Matsunami et al. | |
| 7,971,011 B2 | 6/2011 | Furukawa et al. | |
| 2008/0162754 A1* | 7/2008 | Ogawa et al. ................... | 710/74 |
| 2010/0274825 A1 | 10/2010 | Nemoto et al. | |

FOREIGN PATENT DOCUMENTS

| | | |
|---|---|---|
| JP | 2005-353035 | 12/2005 |
| JP | 2006-260292 | 9/2006 |
| JP | 2010-257095 | 11/2010 |

* cited by examiner

*Primary Examiner* — Joseph E Avellino
*Assistant Examiner* — Marshall McLeod
(74) *Attorney, Agent, or Firm* — Fujitsu Patent Center

(57) ABSTRACT

By generating second data transfer status managing information for managing a data transfer status between the first storing unit and a third storing unit provided in the second storage apparatus, and third data transfer status managing information for managing data transfer status between the second storing unit and a fourth storing unit provided in the second storage apparatus based on the first data transfer status managing information; and transferring data between the first storing unit and the third storing unit based on the second data transfer status managing information, transferring data between the second storing unit and the fourth storing unit based on the third data transfer status managing information, and transferring the first data transfer status managing information, the data transfer status between multiple storing units in a migrating storage apparatus may be reproduced in another migrated storage apparatus.

4 Claims, 28 Drawing Sheets

FIG.3

| MIGRATING APPARATUS | | | | | | | MIGRATED APPARATUS | | | | | | |
|---|---|---|---|---|---|---|---|---|---|---|---|---|---|
| APPARATUS ID | SESSION ID | SOURCE | | DESTINATION | | BC | APPARATUS ID | SESSION ID | SOURCE | | DESTINATION | | BC |
| | | LUN | START LBA | LUN | START LBA | | | | LUN | START LBA | LUN | START LBA | |
| 00 | 00 | 00 | 000 | 10 | 000 | 1000 | 01 | 10 | 10 | 000 | 20 | 000 | 1000 |
| 00 | 01 | 00 | 000 | 11 | 000 | 1000 | 01 | 11 | 10 | 000 | 21 | 000 | 1000 |
| 00 | 02 | 00 | 000 | 12 | 000 | 1000 | 01 | 12 | 10 | 000 | 22 | 000 | 1000 |

↙ 201

| APPARATUS ID | SESSION ID | MIGRATED APPARATUS | | |
|---|---|---|---|---|
| | | LUN | START LBA | BC |
| 01 | 10 | 20 | 000 | 010 |
| 01 | 11 | 21 | 000 | 020 |
| 01 | 12 | 22 | 010 | 020 |
| 01 | 12 | 10 | 020 | 030 |
| 01 | 12 | 10 | 050 | 080 |

202

FIG.12
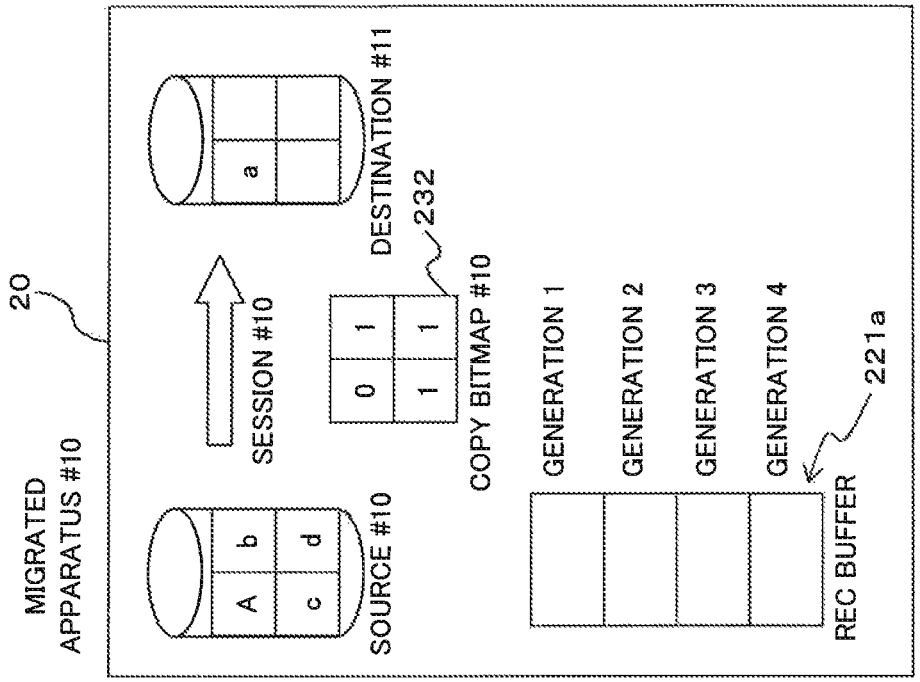
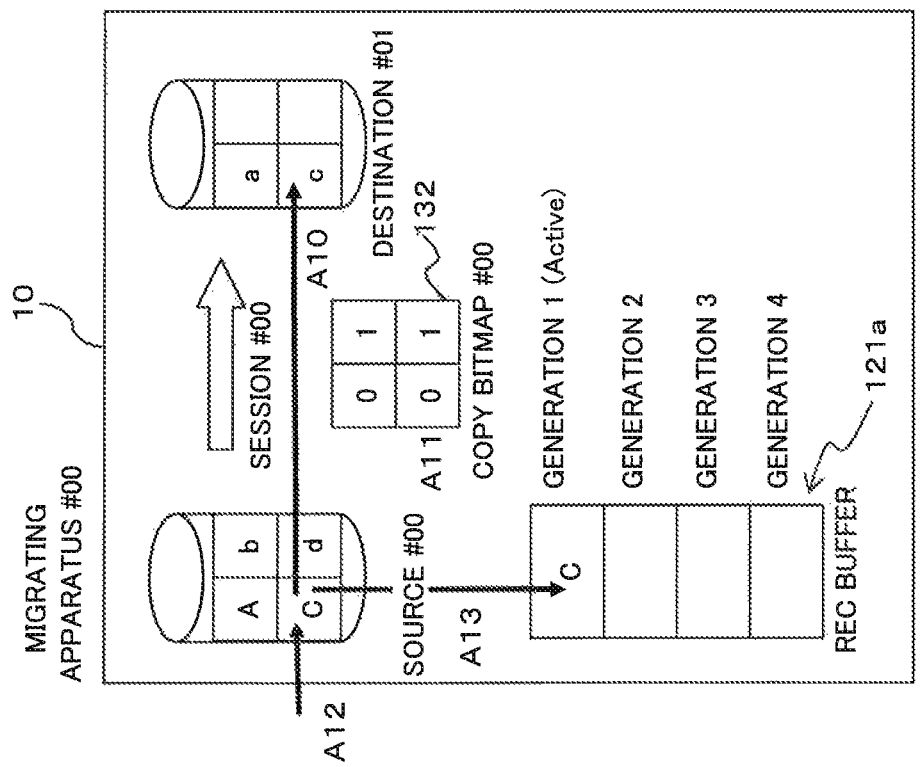

FIG.13
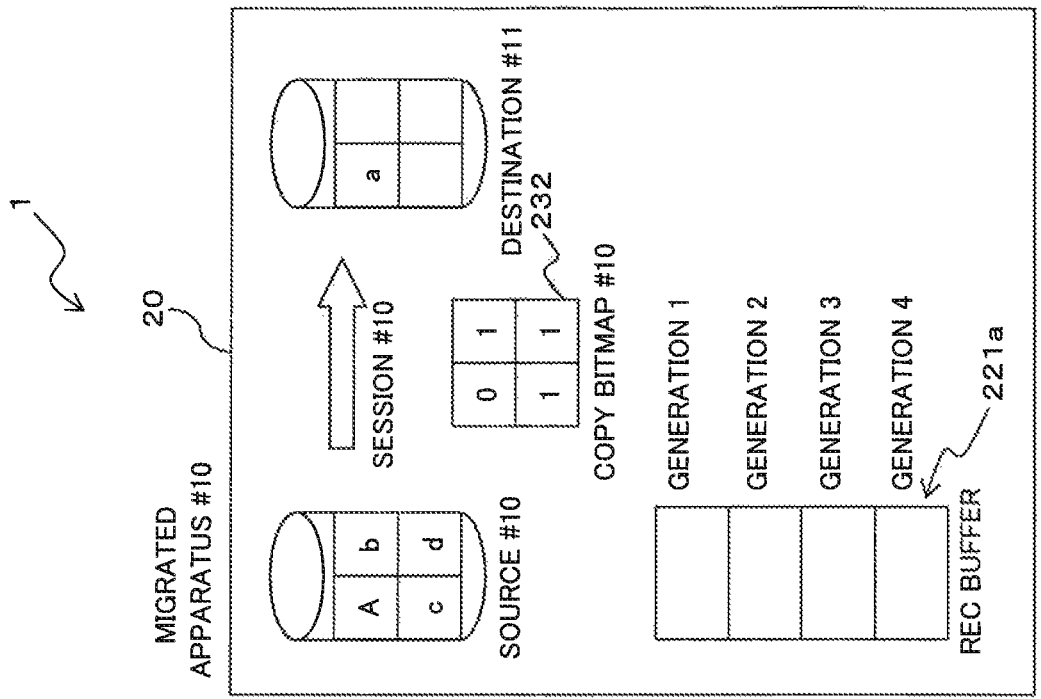
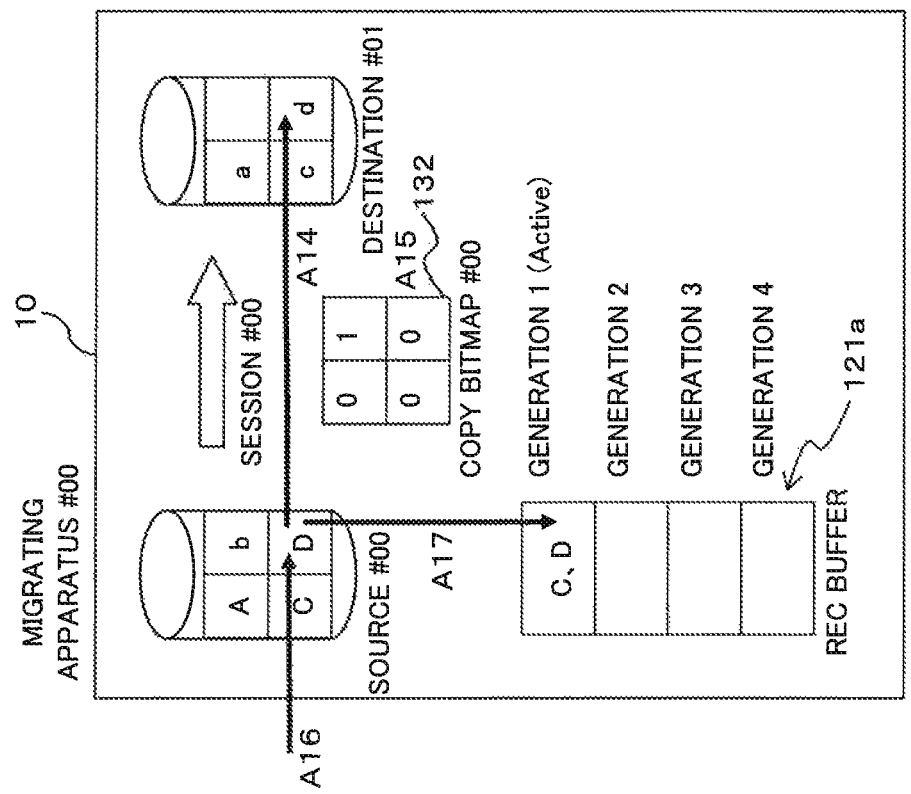

FIG.22
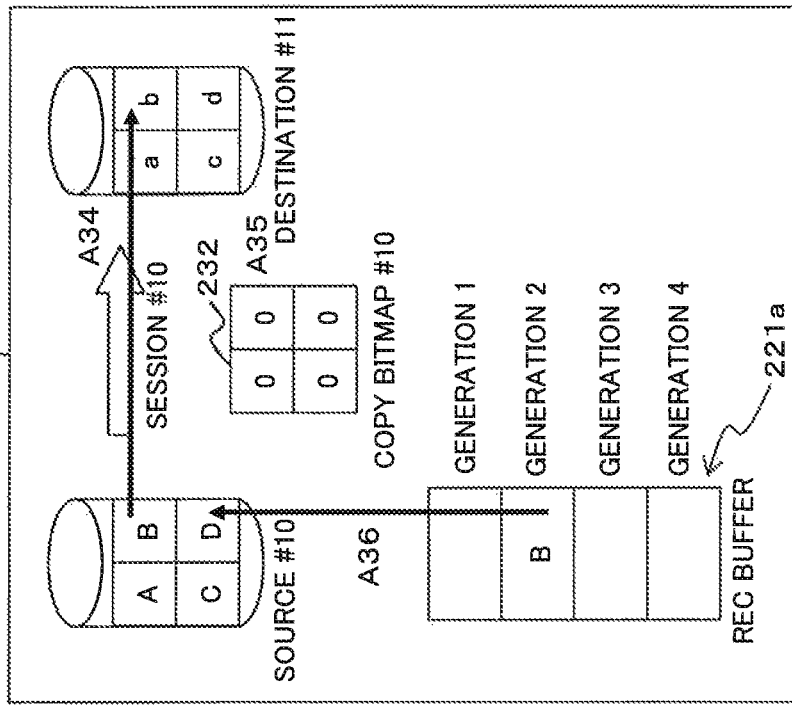
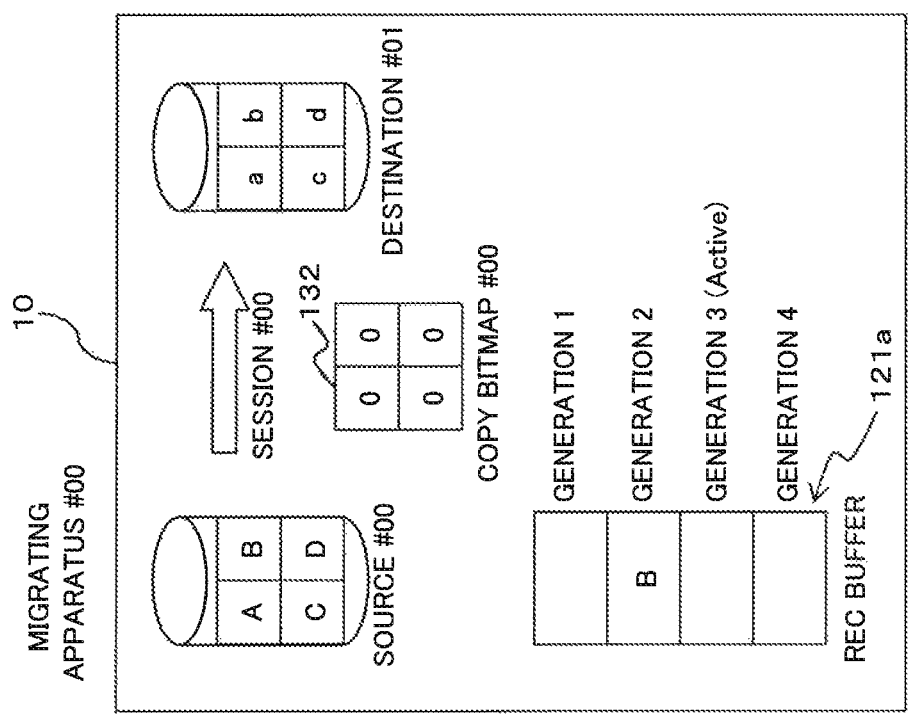

FIG.23
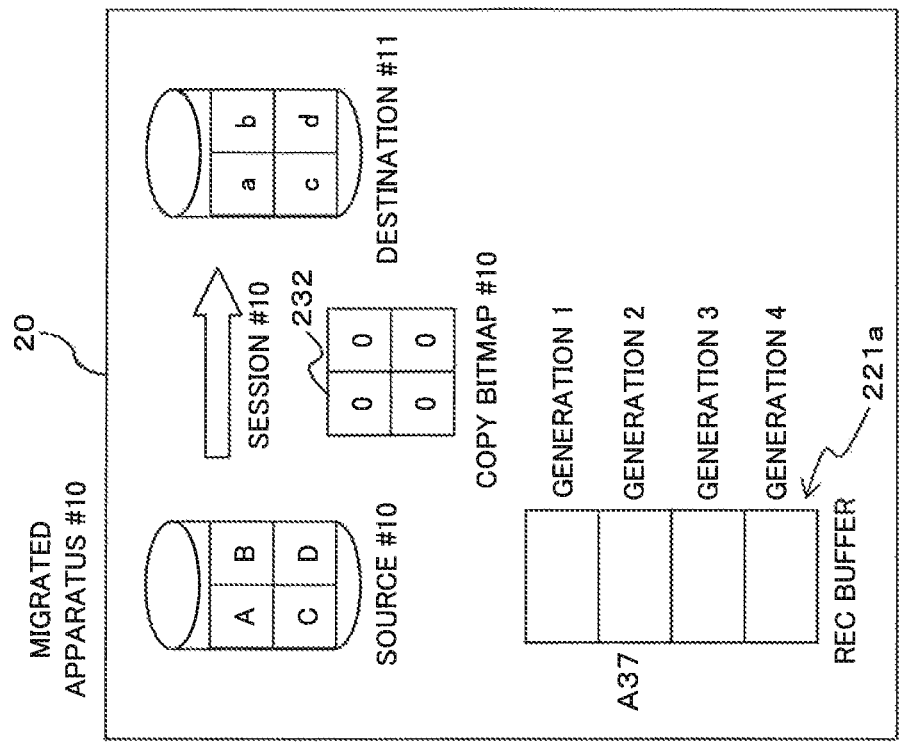
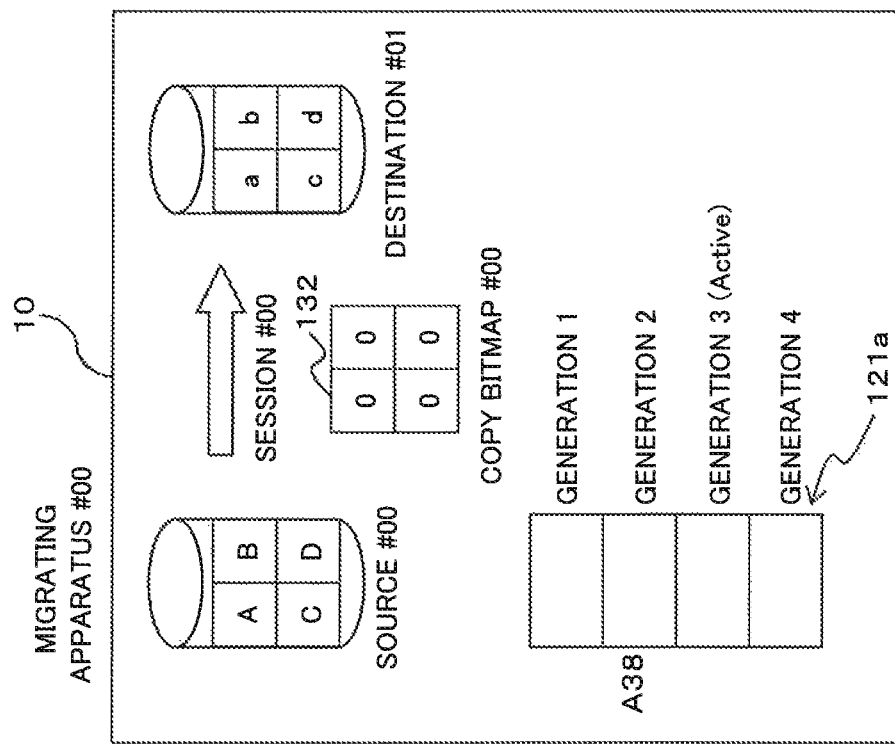

INFORMATION PROCESSING APPARATUS AND NON-TRANSITORY COMPUTER-READABLE RECORDING MEDIUM HAVING PROGRAM STORED THEREON

CROSS-REFERENCE TO RELATED APPLICATION

This application is based upon and claims the benefit of priority of the prior Japanese Patent Application No. 2011-207644, filed on Sep. 22, 2011, the entire contents of which are incorporated herein by reference.

FIELD

The embodiment discussed herein is directed to a storage apparatus and a computer readable recording medium having a program stored thereon.

BACKGROUND

A storage system is provided with multiple storages, wherein a backup is made by copying one storage (working storage) to another storage (backup storage).

Additionally, a remote copy function has been known wherein data in one storage system of multiple storage systems remote from each other is copied to another storage system.

For example, in a synchronous copy mode, write of data to a source storage system is executed synchronously with write of data to a destination storage system, for achieving the mirroring between remote sites.

Patent Reference 1: Japanese Laid-open Patent Publication No. 2006-260292

In such conventional remote copy techniques for a storage system, however, information about the difference status of a copy from a working storage to a backup storage in a source storage system may not be migrated to a destination storage system, which is inconvenient.

SUMMARY

Accordingly, A storage apparatus that transfers data to a second storage apparatus connected via a network, the storage apparatus includes: a first storing unit that stores source data; a second storing unit that stores backup data corresponding to the data; a control information storing unit that stores first data transfer status managing information for managing a data transfer status between the first storing unit and the second storing unit; a data transfer controller that controls a data transfer between the first storing unit and the second storing unit; a receiver that receives a data migration instruction for migrating data stored in the first storing unit and the second storing unit to the second storage apparatus; a data transfer status managing information generator that generates, in response to receiving the data migration instruction, second data transfer status managing information for managing a data transfer status between the first storing unit and a third storing unit provided in the second storage apparatus, and third data transfer status managing information for managing data transfer status between the second storing unit and a fourth storing unit provided in the second storage apparatus based on the first data transfer status managing information; and a data migration controller that transfers data between the first storing unit and the third storing unit based on the second data transfer status managing information, transfers data between the second storing unit and the fourth storing unit based on the third data transfer status managing information, and transfers the first data transfer status managing information.

Further, A computer readable recording medium having a program stored therein, the program causing a computer to execute data transfer control function to a storage apparatus comprising: a first storing unit that stores source data; a second storing unit that stores backup data corresponding to the data; a control information storing unit that stores first data transfer status managing information for managing a data transfer status between the first storing unit and the second storing unit; and a receiver that receives a data migration instruction for migrating data stored in the first storing unit and the second storing unit to the second storage apparatus, the program causes the computer to: control a data transfer between the first storing unit and the second storing unit; generate, in response to receiving the data migration instruction, second data transfer status managing information for managing a data transfer status between the first storing unit and a third storing unit provided in the second storage apparatus, and third data transfer status managing information for managing data transfer status between the second storing unit and a fourth storing unit provided in the second storage apparatus based on the first data transfer status managing information; and transfer data between the first storing unit and the third storing unit based on the second data transfer status managing information, transfer data between the second storing unit and the fourth storing unit based on the third data transfer status managing information, and transfer the first data transfer status managing information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 3 is a diagram illustrating a session mapping table in the storage system as one example of an embodiment;

FIG. 12 is a diagram illustrating statuses of migrating and migrated apparatuses in the storage system as one example of an embodiment;

FIG. 13 is a diagram illustrating statuses of migrating and migrated apparatuses in the storage system as one example of an embodiment;

FIG. 22 is a diagram illustrating statuses of migrating and migrated apparatuses in the storage system as one example of an embodiment;

FIG. 23 is a diagram illustrating statuses of migrating and migrated apparatuses in the storage system as one example of an embodiment;

DESCRIPTION OF EMBODIMENT(S)

Hereinafter, an embodiment of a storage system and a computer-readable recording medium having a program stored thereon will be described with reference to the drawings. Note that the embodiment below is described by way of example only, and various modifications and applications of techniques that are not shown explicitly in the embodiments illustrated below are not intended to be excluded. Various modifications of the embodiment may be implemented without departing from the spirit of the embodiment.

Figure 1:
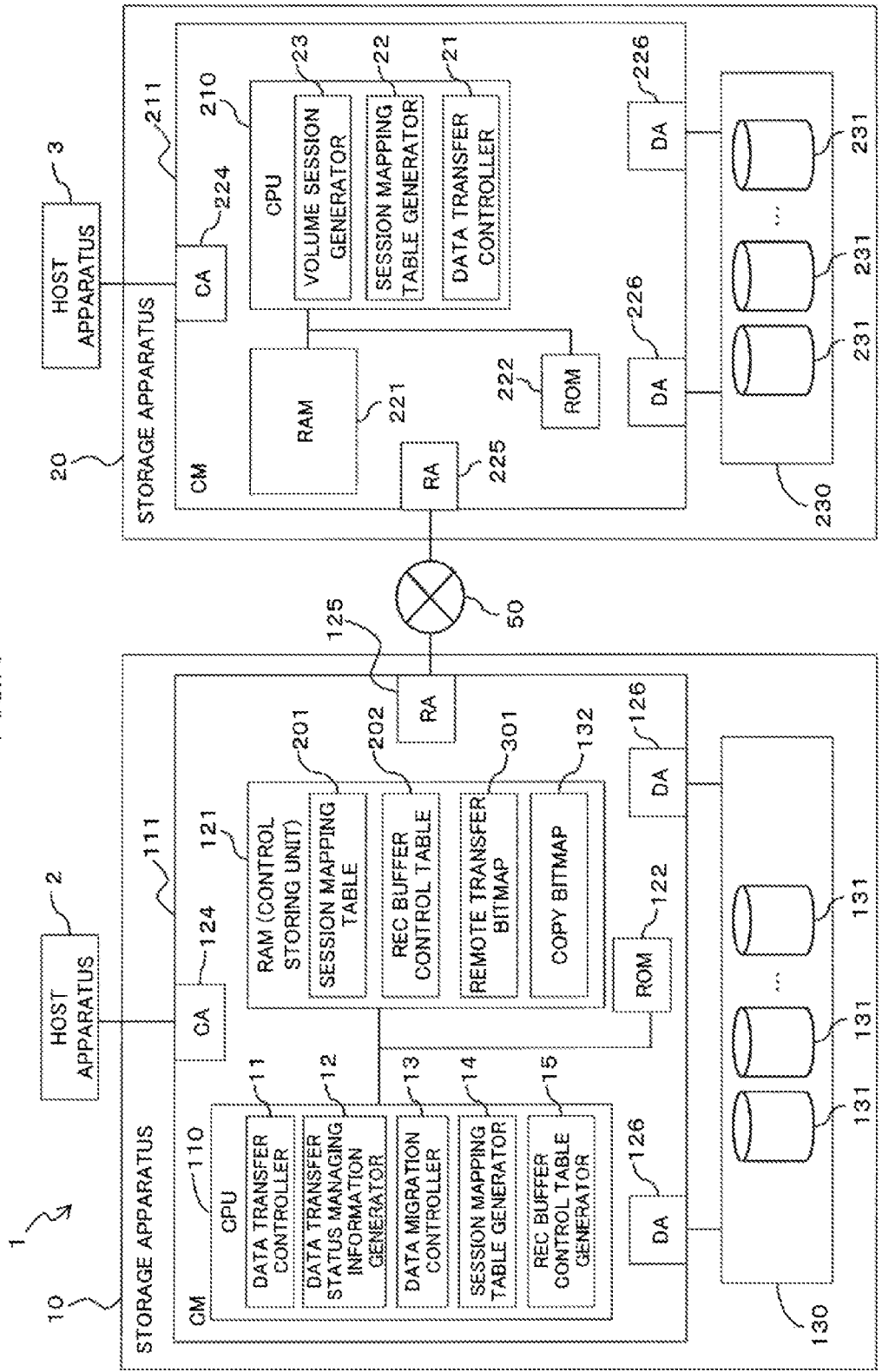
FIG. 1 is a diagram schematically illustrating an example of a configuration of a storage system as one example of an embodiment.
Figure 2:
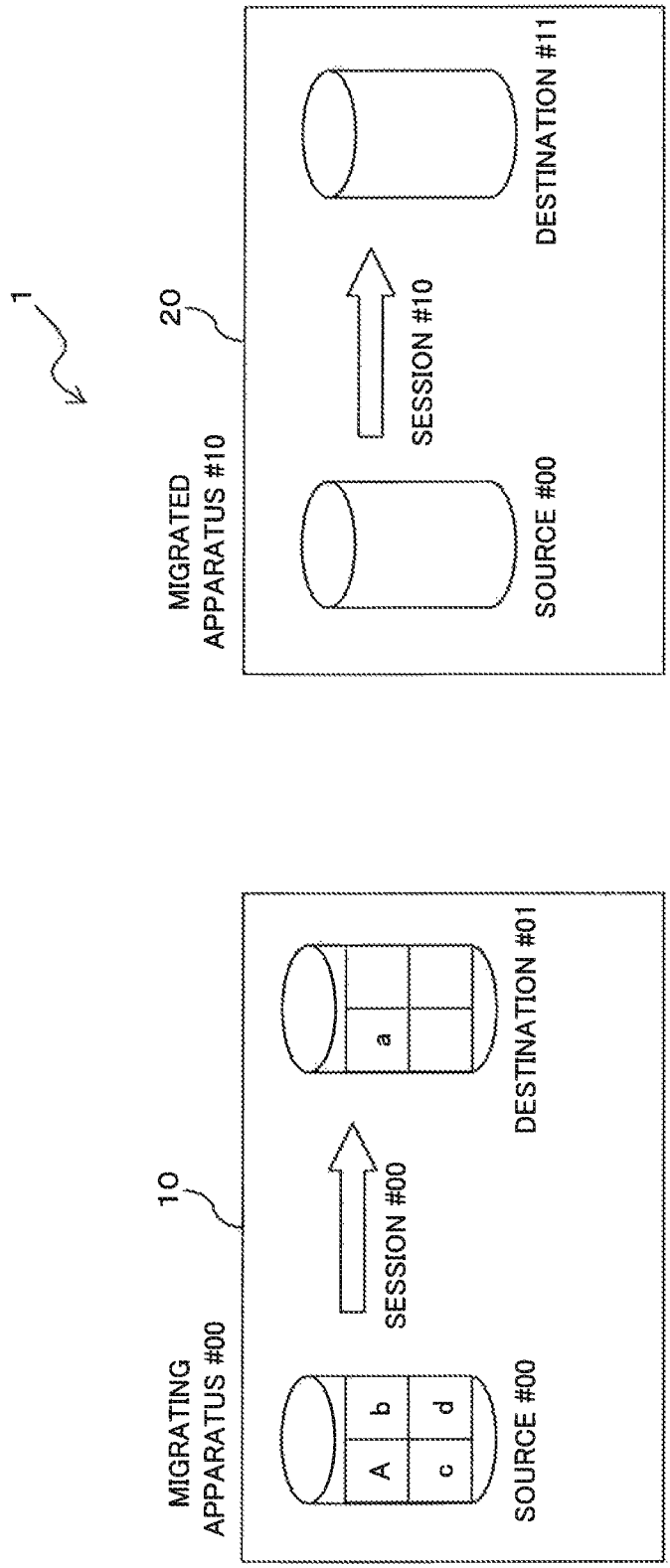
FIG. 2 is a diagram schematically illustrating a volume configuration in storage apparatuses provided in the storage system as one example of an embodiment.

FIG. 1 is a diagram schematically illustrating a storage system 1 as one example of an embodiment, and FIG. 2 is a diagram schematically illustrating a volume configurations in the storage apparatuses 10 and 20.

The storage system 1 as one example of an embodiment is communicatively connected to multiple (two, in the example depicted in FIG. 1) the storage apparatuses 10 and 20 via a remote line (communication line) 50, as depicted in FIG. 1.

The storage apparatuses 10 and 20 include controller modules (CMs, information processing apparatuses) 111 and 211, respectively.

In the example depicted in FIG. 1, a host apparatus 2 as a host apparatus is connected to the storage apparatus 10, while a host apparatus 3 as a host apparatus is connected to the storage apparatus 20.

The host apparatuses 2 and 3 write and read data to and from volumes the storage apparatuses 10 and 20 connected to the host apparatuses 2 and 3. For example, the host apparatus 2 makes a data access request, such as read or write, to a source volume #00 that is a working volume for the storage apparatus 10. The storage apparatus 10, in response to the data access request, makes data access to the source volume #00, and responds to the host apparatus 2.

Note that the host apparatuses 2 and 3 are information processing apparatuses, i.e., computers including a central processing unit (CPU), a random access memory (RAM), and a read only memory (ROM), which are not depicted, for example.

The host apparatus 2 generates session information for a copy session in the storage apparatus 10.

Session information is information on a copy session, and includes a session ID, a logical unit number (LUN) and a start logical block address (LBA) for a source, and an LUN, a start LBA, and a Block Count (BC) for a destination, for example. The session information is used as information related to a migrating apparatus in a session mapping table 201 (described later, refer to FIG. 3). Session information may be generated in any of known techniques.

Session information generated by the host apparatus 2 is sent to the storage apparatus 10 and is stored in an RAM 121 in the storage apparatus 10, for example.

The storage system 1 has a data migration function for migrating (copying) data in a volume (logical volume) in the storage apparatus 10 to the counterpart storage apparatus 20, by means of a data transfer.

Here, the storage apparatus 10 is a source enclosure (migrating apparatus), and the storage apparatus 20 is a destination enclosure (migrated apparatus). Hereinafter, a data migration will be described wherein data in a disk apparatus 131 in the storage apparatus 10 is transferred to the storage apparatus 20, for storing the data to a disk apparatus 231 in the storage apparatus 20.

Hereinafter, the storage apparatus 10 may be referred to as a migrating apparatus #00, and the storage apparatus 20 may be referred to as a migrated apparatus #10. Further, a copy of data may be referred to as a data migration, and a data transfer between the storage apparatus 10 and the storage apparatus 20 through the remote line 50 may be referred to as a remote transfer.

The remote line 50 is a communication line that may communicate data, and provides data transfers based on standards, such as the TCP/IP, for example.

The storage apparatuses 10 and 20 provide storage areas for the host apparatuses 2 and 3, and are RAID (redundant arrays of inexpensive disks) apparatuses, for example. Although the storage apparatus 10 is connected to the host apparatus 2 and the storage apparatus 20 is connected to the host apparatus 3 in FIG. 1, two or more host apparatuses may be connected to the storage apparatuses 10 and 20.

As depicted in FIG. 1, the storage apparatuses 10 and 20 include CMs 111 and 211 and disk enclosures 130 and 230, respectively. The CMs 111 and 211 execute various types of controls on the storage apparatuses 10 and 20, such as access controls on the disk apparatuses 131 and 231 in the disk enclosures 130 and 230, in accordance with a storage access request (access control signal) from the host apparatuses 2 and 3 as host apparatuses.

The disk enclosures 130 and 230 contain one or more disk apparatuses 131 and 231. The disk apparatuses 131 and 231 are hard disk drives (HDDs), for example.

In the storage apparatuses 10 and 20, storage areas in the HDDs 131 and 231 are allocated to logical volumes.

As depicted in FIG. 2, in the storage apparatus 10, the volume #00 which is the source of the copy (hereinafter, referred to as a source volume #00) and the destination volume #01 are provided as logical volumes.

The source volume #00 is a working volume storing data for the host apparatus 2, for example, and data is written to the source volume #00, in accordance with a disk access request from the host apparatus 2. In the storage system 1, data in the source volume #00 in the storage apparatus 10 is backed up, i.e., is to be copied. In other words, the source volume #00 functions as a first storing unit that stores source data.

The destination volume #01 is a volume for backing up the source volume #00 in the storage apparatus 10 (local backup), and data in the source volume #00 (source data) is copied and stored in the destination volume #01 as backup data. In other words, the destination volume #01 functions as a second storing unit provided in the storage apparatus 10 to which a backup data corresponding to data in the source volume #00 is stored.

In the storage apparatus 20, as depicted in FIG. 2, a source volume #10 and a destination volume #11 are provided as logical volumes.

The destination volume #10 is a volume (third storing unit) to which the source volume #00 is copied, and data in the source volume #00 is copied to the source volume #10, as described later.

The destination volume #11 is a volume (fourth storing unit) to which the destination volume #01 is copied, and data in the destination volume #01 is copied to the destination volume #11, as described later.

The CMs 111 and 211 include channel adapters (CAs) 124 and 224, remote adapters (RA) 125 and 225, CPUs 110 and 210, ROMs 122 and 222, and RAMs 121 and 221, respectively. Although the storage apparatuses 10 and 20 include the respective CMs 111 and 211 in the example depicted in FIG. 1, this is not limiting and two or more CMs 111 and 211 may be provided to each of the storage apparatuses 10 and 20.

The CA 124 and 224 are interface controllers communicatively connecting to the host apparatuses 2 and 3, and may be fiber channel adaptors, for example.

For example, when an operator enters, from the host apparatus 2, a data migration instruction from the storage apparatus 10 to the storage apparatus 20, the CA 124 functions as a receiver that receives the data migration instruction.

The RA 125 and 225 are interface controllers communicatively connecting to the counterpart storage apparatuses 20 and 10 through the remote line 50, and may be fiber channel adaptors, for example.

The RAMs 121 and 221 are memories (storage areas) that temporarily store various types of data and programs. In certain areas in the RAMs 121 and 221, data to be sent to the counterpart storage apparatuses 20 and 10 is temporarily stored, and thus, the RAMs 121 and 221 function as remote equivalent copy (REC) buffer memories 121a and 221a (refer to FIG. 12).

The REC buffers 121a and 221a are divided into multiple regions, in order to assure consistency of the order among data read and write processing. The divided regions are each managed as generations. In the example depicted in FIG. 12, the REC buffers 121a and 221a are divided into four generations, namely, Generations 1-4. Generations are managed in chronological order. The generations are freed up after copy processing between the storage apparatuses 10 and 20 is completed. The term "freeing up" refers to make the generation to be able to store new data.

A remote transfer of data using the REC buffers 121a and 221a will be described later.

As described above, the RAMs 121 and 221 function as transfer data buffers that temporarily store data to be transferred to the counterpart storage apparatuses 20 and 10, during a remote transfer which will be described later.

Further, data received from the host apparatuses 2 and 3 and data to be sent to the host apparatuses 2 and 3 are temporarily stored in the other areas in the RAMs 121 and 221, and thus the RAMs 121 and 221 also function as buffer memory.

In other areas in the RAMs 121 and 221, data and programs are temporarily stored when the CPUs 110 and 210 which will be described later is executed. Further, a certain area in the RAM 121, a session mapping table 201 and a REC buffer control table 202 (described later) are stored.

In addition, in a certain area in the RAM 121, a copy bitmap 132 and a remote transfer bitmap 301 (described later) are stored. In other words, the RAM 121 also functions as a control information storing unit that stores first data transfer status managing information for managing a data transfer status between the source volume #00 and the destination volume #01.

The ROMs 122 and 222 are storage devices that store programs executed by the CPUs 110 and 210 and various types of data.

The CPUs 110 and 210 are processing apparatuses that execute various types of computing and controls, and implement various functions by executing programs stored in the ROM 122 and the like.

The CPU 110 function as a data transfer controller 11, a data transfer status managing information generator 12, a data migration controller 13, a session mapping table generator 14, and a REC buffer control table generator 15, as depicted in FIG. 1.

The CPU 210 functions a data transfer controller 21, a session mapping table generator 22, and a volume session generator 23, as depicted in FIG. 1.

Note that programs for implementing the functions as a data transfer controller 11, a data transfer status managing information generator 12, a data migration controller 13, a session mapping table generator 14, and a REC buffer control table generator 15, and a data transfer controller 21, a session mapping table generator 22, and a volume session generator 23 are provided in the form of programs recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD-DVD), a Blu Ray disk, a magnetic disk, an optical disk, a magneto-optical disk, or the like. The computer then reads a program from that storage medium and uses that program after transferring it to the internal storage apparatus or external storage apparatus or the like. Alternatively, the program may be recoded on a storage device (storage medium), for example, a magnetic disk, an optical disk, a magneto-optical disk, or the like, and the program may be provided from to the storage device to the computer through a communication path.

Note that programs for implementing the functions as the data transfer controller 11, the data transfer status managing information generator 12, the data migration controller 13, the session mapping table generator 14, and the REC buffer control table generator 15, programs stored in an internal storage apparatus (the RAM 121 or the ROM 122 in this embodiment) is executed by a microprocessor (the CPU 110 in this embodiment) in the computer. In this case, the computer may alternatively read a program stored in the storage medium for executing it.

Upon embodying the functions as the data transfer controller 21, the session mapping table generator 22, and the volume session generator 23, programs stored in an internal storage device (the RAM 221 or the ROM 222 in this embodiment) is executed by a microprocessor (the CPU 110 in this embodiment) in the computer. In this case, the computer may alternatively read a program stored in the storage medium for executing it.

Note that, in this embodiment, the term "computer" may be a concept including hardware and an operating system, and may refer to hardware that operates under the control of the operating system. Alternatively, when an application program alone may make the hardware to be operated without requiring an operating system, the hardware itself may represent a computer. The hardware includes at least a microprocessor, e.g., CPU, and a means for reading a computer program recorded on a storage medium and, in this embodiment, the CMs 111 and 211 include a function as a computer.

The data transfer controller 11 controls data transfers between the source volume #00 (first storing unit) and the destination volume #01 (second storing unit). In this embodiment, the data transfer controller 11 executes data transfers from the source volume #00 to the destination volume #01 using SnapOPC+.

SnapOPC+ provides generation management of backup data, and is based on SnapOPC. As used herein, SnapOPC is a technique wherein, upon a backup of the data, only update part in data in a source volume is backed up.

In other words, in the storage apparatus 10, data of a part of the source volume #00 before an update is copied to the destination volume #01.

SnapOPC+ enables copy without requiring allocation of areas in a backup volume in the same size as the size of the working volume. SnapOPC+ enables reduction in the disk space in the user environment wherein the entire update of the volume is not expected, thereby reducing the cost related to the copy.

In SnapOPC+, a backup volume is a virtual volume (SDV) that is smaller than a working volume. The virtual volumes may be logically accessible from the host apparatuses 2 and 3 in the similar manner as typical volumes. In this embodiment, the destination volume #01 and the destination volume #11 represent backup volumes.

When a working volume is updated, the data transfer controller 11 copies data in the updated area before the update (old data) to a destination backup volume, rather than making an initial copy (copy of the entire source volume #00). When an access to the backup volume (the destination volume #01) is made from the host apparatus 2, the access is directed to the working volume (the source volume #00), if the accessed area has not been copied yet. In addition, since multiple backup volumes are provided, backups in multiple generations may be generated.

Hereinafter, a copy of data from a source volume to a destination volume is sometimes referred to as a copy session or simply session.

A session mapping table generator 14 generates a session mapping table 201.

FIG. 3 is a diagram illustrating a session mapping table 201 in the storage system 1 as one example of an embodiment.

The session mapping table 201 is information (copy session correspondence information) mapping copy sessions in the storage apparatus 10 (migrating apparatus) to copy sessions in the storage apparatus 20 (migrated apparatus).

The session mapping table 201 is created by mapping information on copy sessions in a migrating apparatus to information on copy sessions in a migrated apparatus, as depicted in FIG. 3. Specifically, the information on copy sessions in a migrating apparatus includes an apparatus ID, a session ID, an LUN and a start LBA of the source, and an LUN, a start LBA and BC of the destination.

The information on copy sessions in a migrated apparatus is created for each copy session in the migrating apparatus. Accordingly, items of information similar to the items of information of the migrating apparatus are registered as the information on copy sessions in a migrated apparatus. Each copy session registered for the migrated apparatus is generated by a volume session generator 23 (described later) in the storage apparatus 20 (migrated apparatus).

Here, the apparatus ID is an identifier set to the storage apparatus 10 or 20, and the session ID is a unique identifier specifying each copy session. The source LUN is an LUN set to a volume where data to be copied in the copy session is stored, i.e., the LUN set to the volume from which the data is transferred. The source start LBA is an address of the start location of the area copied in the copy session. The destination LUN is an LUN set to a volume to which the data is transferred in the copy session volume. The destination start LBA is an address of the start location where the data is copied in the copy session. The BC is the size of the data copied in the copy session (copy size).

For example, the first item in the session mapping table 201 depicted in FIG. 3 indicates that a session with a session ID of "10" in the migrated apparatus (storage apparatus 20) having an apparatus ID of "01" is set, mapped to a session with a session ID of "00" in the migrating apparatus (storage apparatus 10) having an apparatus ID of "00".

In the copy session with a session ID of "00", data of 1000 blocks starting from an start address of an LBA "000" in a volume of an LUN of "00" is copied to an area starting from an start address of an LBA "000" in a volume of an LUN of "10".

In the copy session with a session ID of "10" corresponding to the copy session with a session ID of "00", data of 1000 blocks starting from an start address of an LBA "000" in a volume of an LUN of "10" is copied to an area starting from an start address of an LBA "000" in a volume of an LUN of "20".

A data transfer status managing information generator 12 (described later) then generates a remote transfer bitmap 301 using the session mapping table 201.

A REC buffer control table generator 15 generates a REC buffer control table 202.

Figure 4:
FIG. 4 is a diagram illustrating a REC buffer control table in the storage system as one example of an embodiment.

FIG. 4 is a diagram illustrating a REC buffer control table 202 in the storage system 1 as one example of an embodiment.

The REC buffer control table 202 maintains locations for writing data upon a data transfer from the migrating apparatus (storage apparatus 10) to the migrated apparatus (storage apparatus 20).

In the example depicted in FIG. 4, the REC buffer control table 202 is generated by mapping an apparatus ID, the session ID of the migrated apparatus, an LUN, a start LBA and BC.

The REC buffer control table generator 15 generates the REC buffer control table 202 by extracting information on the migrated apparatus from the session mapping table 201, for example.

When writing migration data to the migrated apparatus (storage apparatus 20), a data migration controller 13 (described later) checks the REC buffer control table 202 to identify the write location of data.

A data transfer status managing information generator 12 generates data transfer status managing information for managing data transfer statuses between volumes provided in the storage system 1.

For example, in the storage apparatus 10, the data transfer status managing information generator 12 generates a copy bitmap 132 for managing a data transfer status of a session #00, i.e., a data transfer between the source volume #00 and the destination volume #01.

The copy bitmap 132 is generated by mapping information whether or not data is transferred to the destination volume #01 for each of multiple unit areas in a certain unit size (e.g., 8 KB) which are defined by dividing the source volume #00. In other words, the copy bitmap 132 maintains the progress of a data transfer in the source volume #00. Hereinafter, the copy bitmap 132 may be sometimes referred to as a copy bitmap #00.

Figure 5:
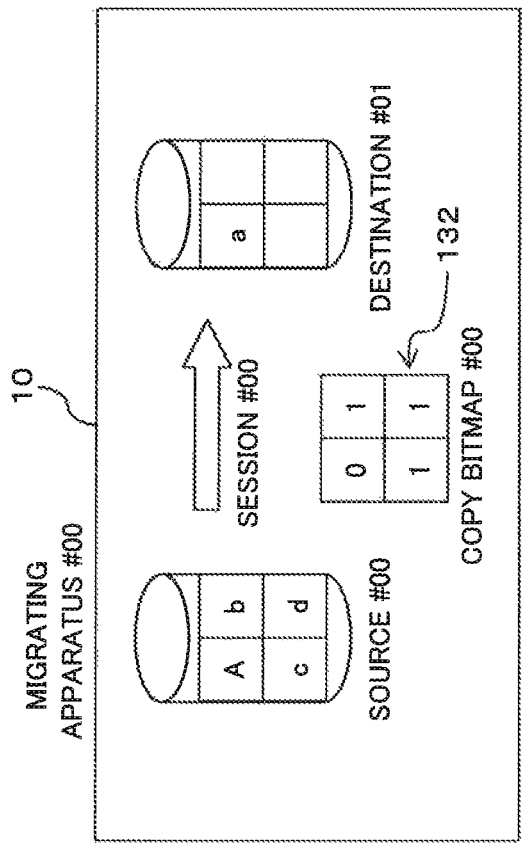
FIG. 5 is a diagram illustrating a copy bitmap in the storage system as one example of an embodiment.

FIG. 5 is a diagram illustrating a copy bitmap #00 in the storage system 1 as one example of an embodiment.

In the example depicted in FIG. 5, the destination volume #01 is divided into four areas (portions). In the copy bitmap #00, a value of "0" or "1" indicating whether data is transferred is allocated to each of the four areas in the destination volume #01. For example, a value "1" is assigned for areas where data has not been transferred yet, while a value "0" is assigned for areas where data has been transferred and copy is not required.

Hence, by using the copy bitmap 132, a determination whether or not a data transfer has been completed may be easily made for each of multiple areas in the destination volume #01.

In the storage apparatus 10, if there are multiple copy sessions, the data transfer status managing information generator 12 generates a copy bitmap #00 for each session.

The data transfer status managing information generator 12 also generates a remote transfer bitmap 30, in response to receiving a data migration instruction from the storage apparatus 10 to the storage apparatus 20.

Figure 6:
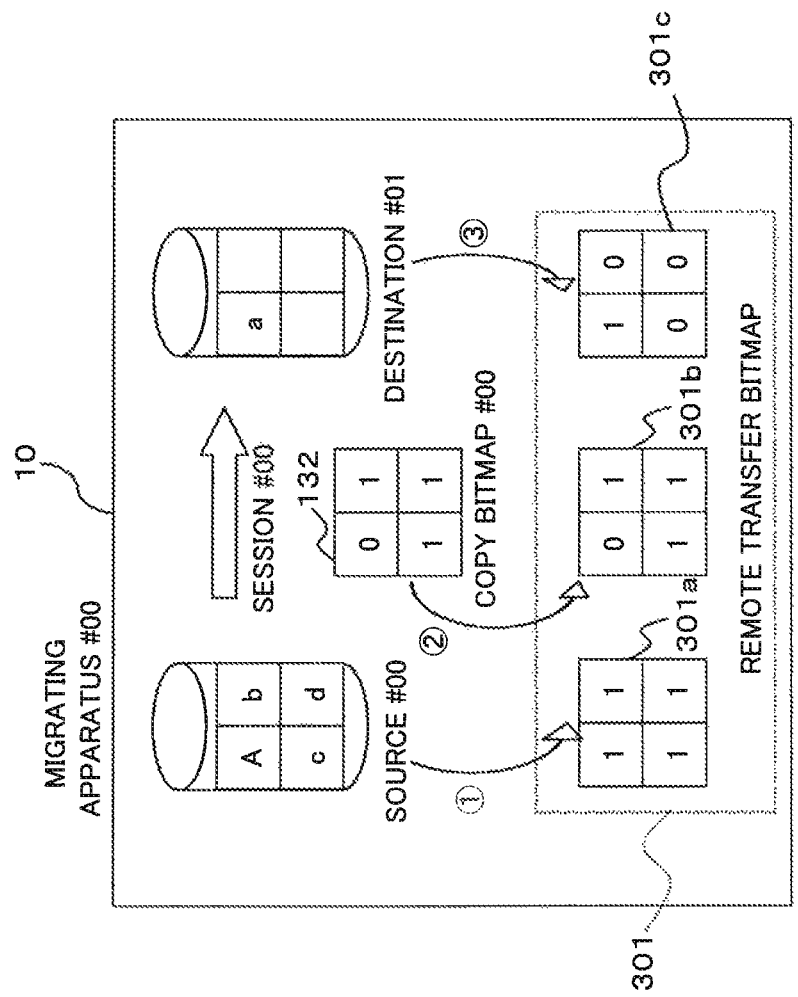
FIG. 6 is a diagram illustrating a remote transfer bitmap in the storage system as one example of an embodiment.

FIG. 6 is a diagram illustrating a remote transfer bitmap 301 in the storage system 1 as one example of an embodiment.

The remote transfer bitmap 301 maintains data transfer statuses for data to be transferred, for a remote data transfer between the transferring storage apparatus 10 and the data-migrated storage apparatus 20.

In this embodiment, in a remote data transfer from the transferring storage apparatus 10 to the transferred storage apparatus 20, data in the source volume #00, the destination volume #01, and the copy bitmap #00 in the storage apparatus 10 is to be transferred.

For this purpose, in this embodiment, the remote transfer bitmap 301 has a first remote transfer bitmap 301a, a second remote transfer bitmap 301b, and a third remote transfer bitmap 301c, corresponding to the source volume #00, the destination volume #01, and the copy bitmap #00, respectively, as depicted in FIG. 6.

The first remote transfer bitmap (second data transfer status managing information) 301a maintains data transfer statuses for the source volume #00. The first remote transfer bitmap 301a is generated by mapping information whether or not data is transferred to the source volume #10 in the storage apparatus 20 for each of multiple unit areas in a certain unit size (e.g., 8 KB) which are defined by dividing the source volume #00.

In the example depicted in FIG. 6, the source volume #00 is divided into four areas (portions). In the first remote transfer bitmap 301a, a value of "0" or "1" indicating whether data is transferred is allocated to each of the four areas in the source volume #00. For example, a value "1" is assigned for areas where data has not been transferred yet, while a value "0" is assigned for areas where data has been transferred and copy is not required. Hence, by using the first remote transfer bitmap 301a, a determination whether or not a data transfer has been completed may be easily made for each of multiple areas in the source volume #00.

In other words, the first remote transfer bitmap 301a maintains a data transfer status between the source volume #00 and the source volume #10 in the counterpart storage apparatus 20 (third storing unit), i.e., the progress of the data transfer.

The second remote transfer bitmap 301b maintains a data transfer status for the copy bitmap #00. The second remote transfer bitmap 301b is generated by mapping information whether or not data is transferred to the copy bitmap #10 in the storage apparatus 20 for each of multiple unit areas in a certain unit size (e.g., 8 KB) which are defined by dividing the copy bitmap #00.

In the example depicted in FIG. 6, the copy bitmap #00 is divided into four areas (portions). In the first remote transfer bitmap 301a, a value of "0" or "1" indicating whether data is transferred is allocated to each of the four areas in the copy bitmap #00. For example, a value "1" is assigned for portions where data has not been transferred yet, while a value "0" is assigned for portions where data has been transferred and copy is not required. Hence, by using the second remote transfer bitmap 301b, a determination whether or not a data transfer has been completed may be easily made for each of multiple areas in the copy bitmap #00.

In other words, the second remote transfer bitmap 301b maintains a data transfer status of the copy bitmap #00 to another storage apparatus 20, i.e., the progress of the data transfer.

The third remote transfer bitmap (third data transfer status managing information) 301c maintains data transfer statuses for the destination volume #00. The third remote transfer bitmap 301c is generated by mapping information whether or not data is transferred to the destination volume #11 in the storage apparatus 20 for each of multiple unit areas in a certain unit size (e.g., 8 KB) which are defined by dividing the destination volume #01.

In the example depicted in FIG. 6, the destination volume #01 is divided into four areas. In the third remote transfer bitmap 301c, a value of "0" or "1" indicating whether data is transferred is allocated to each of the four areas in the destination volume #01. For example, a value "1" is assigned for areas where data has not been transferred yet, while a value "0" is assigned for areas where data has been transferred and copy is not required. Hence, by using the third remote transfer bitmap 301c, a determination whether or not a data transfer has been completed may be easily made for each of multiple areas in the destination volume #01.

In other words, the third remote transfer bitmap 301c maintains a data transfer status between the destination volume

01 and the destination volume #11 in the counterpart storage apparatus 20 (fourth storing unit), i.e., the progress of the data transfer.

Note that the size of the unit area for dividing the source volume #00, the destination volume #01, and the copy bitmap #00 for generating the remote transfer bitmap 301 is not limited to 8 KB, and may be modified to any suitable value.

Preferably, the data transfer status managing information generator 12, upon generating the remote transfer bitmap 301, sets a value of "1" indicating that data is not transferred, only to the areas where data is actually stored in the source volume #00 and the destination volume #01. This may prevent wasteful data transfer jobs from the storage apparatus 10 to the storage apparatus 20 from occurring, thereby improving the efficiency of data transfers.

A data migration controller 13 transfers data in the source volume #00, the destination volume #01, and the copy bitmap #00 in the storage apparatus 10 (migrating apparatus) to the storage apparatus 20 (migrated apparatus), based on the remote transfer bitmap 301.

The data migration controller 13 transfers data in multiple data transfers in a certain data size (e.g., 256 KB), in order to copy data in a logical volume (source volume) in the storage apparatus 10 to a logical volume in the storage apparatus 20. Thereby, statuses of the volume in the storage apparatus 10 and the volume in the storage apparatus 20 are matched.

The data migration controller 13 executes a data transfer from a migrating apparatus #00 to a migrated apparatus #10, using a function for ensuring the consistency among writing in a remote copy in an asynchronous mode, such as the REC consistency mode function, for example.

In such a REC consistency mode function, by copying asynchronously with writing from the host apparatus 2 to the source volume #00, a data transfer from source volume to a backup volume may be carried out without negatively affecting the write performance to the source volume #00.

The data migration controller 13 determines whether or not a data transfer for copy is required, using the remote transfer bitmap 301. More specifically, the data migration controller 13 determines that a data transfer for copy is required for areas (portions) to which a value "1" is set in the remote transfer bitmap 301, indicating that data is not transferred, and executes a data transfer.

Specifically, the data migration controller 13 transfers data in the source volume #00 to which a value "1" is set in the first remote transfer bitmap 301a, to the source volume #10 in the storage apparatus 20.

Further, the data migration controller 13 transfers data in the destination volume #01 to which a value "1" is set in the third remote transfer bitmap 301c, to the destination volume #11 in the storage apparatus 20.

Further, the data migration controller 13 transfers data in a portion in the copy bitmap #00 to which a value "1" is set in the second remote transfer bitmap 301b, to the storage apparatus 20.

Additionally, when data in the source volume #00 is updated, the data migration controller 13 stores the data in the source volume #00 to a REC buffer 121a, and controls to switch between generations of the REC buffer 121a.

On the other hand, in the storage apparatus 20 (migrated apparatus), a data transfer controller 21 controls data transfers between the source volume #10 and the destination volume #11. In this embodiment, the data transfer controller 21 executes data transfers from the source volume #10 to the destination volume #11 using SnapOPC+. Data transfers by the data transfer controller 21 are executed in the similarly to those by the data transfer controller 11 in the storage apparatus 10 described above, and detailed description therefor will be omitted.

When a data migration is started, a volume session generator 23 generates a volume to which data from the storage apparatus 10 is to be migrated, and a copy session. More specifically, the volume session generator 23 generates a source volume #10, a destination volume #11, and a copy bitmap #10.

The volume session generator 23 merely reserves areas in the source volume #10 and the destination volume #11. The volume session generator 23 reserves areas in the volumes by checking the size information of the source volume #00 and the destination volume #01, and setting predetermined addresses in the storage area in the storage apparatus 20, as start LBAs. For the copy bitmap #10, the volume session generator 23 reserves a storage area in the size same as that of the copy bitmap #00, and sets a value "0", as initial values, indicating that no copy is required, for each unit area in the copy bitmap #10.

The volume session generator 23 generates a destination volume and a copy session, in response to receiving a generation request from the storage apparatus 10 (migrating apparatus).

The volume session generator 23 also updates the generated copy bitmap.

A session mapping table generator 22 generates a session mapping table 201. The generation of the session mapping table 201 by session mapping table generator 22 is similar to that by the session mapping table generator 14 described above, and detailed description therefor will be omitted.

A remote copy in the storage system 1 as one example of an embodiment configured as described above will be described with reference to FIGS. 7 to 23.

(1) Initial Status

Figure 7:
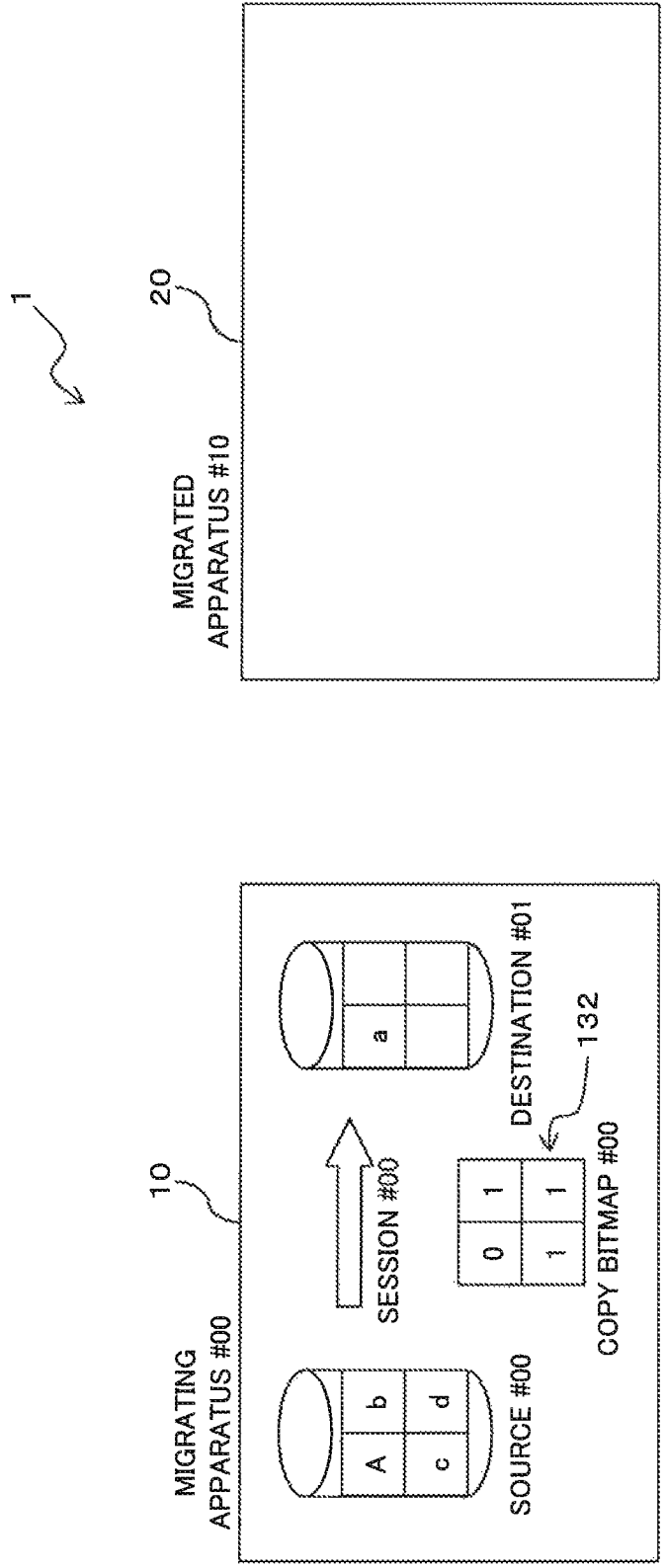
FIG. 7 is a diagram illustrating statuses of migrating and migrated apparatuses in the storage system as one example of an embodiment.

The statuses of a migrating apparatus #00 (storage apparatus 10) and a migrated apparatus #10 (storage apparatus 20) in the storage system 1 before a remote copy is started are depicted in FIG. 7.

The destination volume #01 in the migrating apparatus #00 is a virtual volume (SDV), and a copy session #00 from the source volume #00 to the destination volume #01 is done by SnapOPC+.

In the initial status of the storage system 1, after creation of a snap shot by SnapOPC+, after an area in the source volume #00 (working volume) is written, an operator sets mirroring for the copy session #00 using software, for example.

In the initial status, as depicted in FIG. 7, a source volume #00 and a destination volume #01 are set to the migrating apparatus #00. Further, a copy session #00 for mirroring the source volume #00 to the destination volume #01 is also set, and a copy bitmap #00 indicating the data migration status therefor is generated.

(2) Generation of Volume Session in Migrated Apparatus

Figure 8:
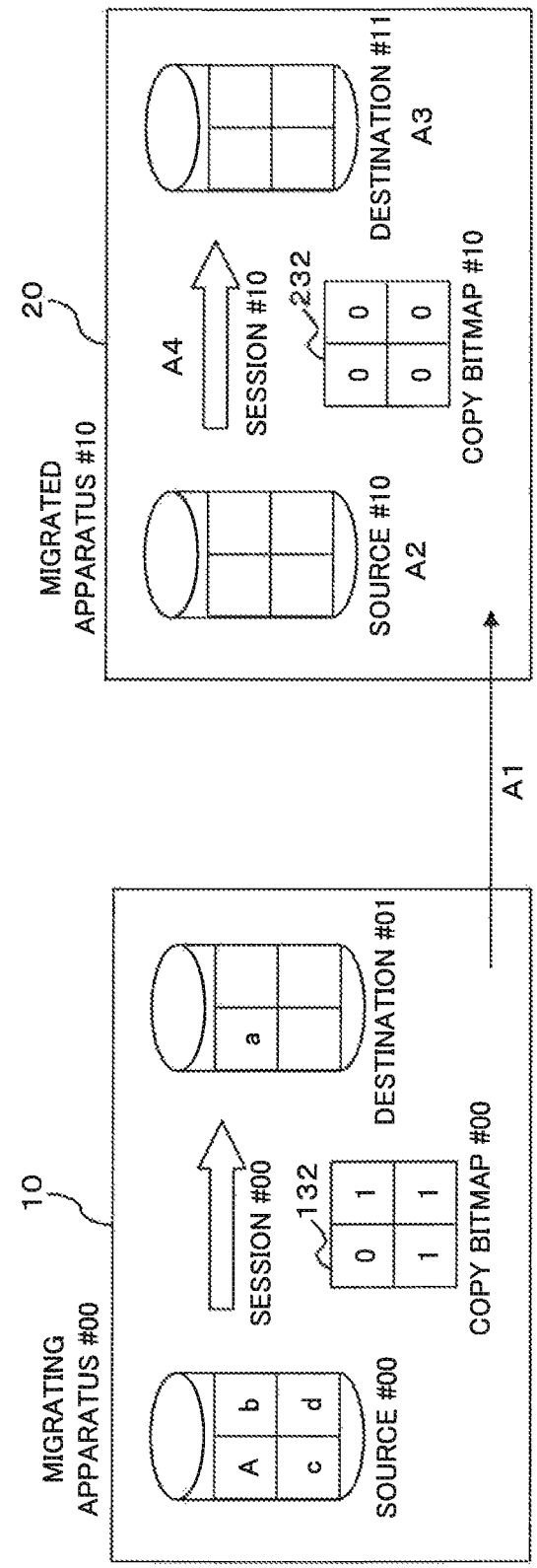
FIG. 8 is a diagram illustrating statuses of migrating and migrated apparatuses in the storage system as one example of an embodiment.

The status during volume session generation processing in the migrated apparatus #10 in the storage system 1 is depicted in FIG. 8.

(2-1) Firstly, a generation request for a volume session is made from the migrating apparatus #00 to the migrated apparatus #10 (refer to the symbol A1). In response to the generation request, in the migrated apparatus #10, the volume session generator 23 initiates to generate a volume and copy session.

(2-2) The volume session generator 23 generates a source volume #10 in the migrated apparatus #10 (refer to the symbol A 2).

(2-3) The volume session generator 23 also generates a destination volume #11 in the migrated apparatus #10 (refer to the symbol A 3).

(2-4) The volume session generator 23 generates a copy bitmap #10 in the migrated apparatus #10 (refer to the symbol A 4).

In the source volume #10 and the destination volume #11, only areas are reserved, without data being stored in the data areas, and only initial values or NULL are stored, for example. Further, a value "0" indicating that no copy is required is also stored corresponding to each unit area in the copy bitmap #10.

(3) Generation of Remote Transfer Bitmap

Figure 9:
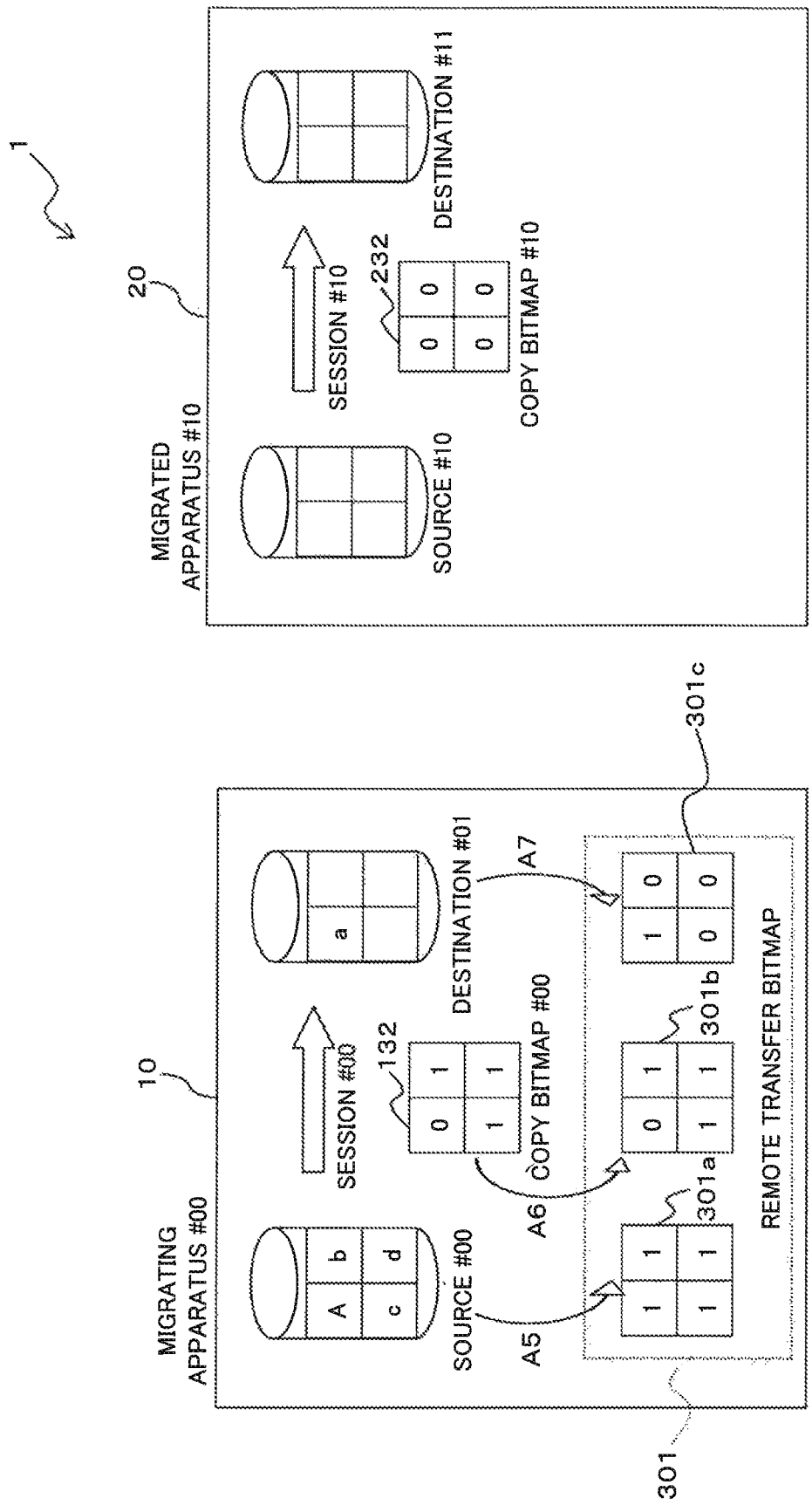
FIG. 9 is a diagram illustrating statuses of migrating and migrated apparatuses in the storage system as one example of an embodiment.

The status during processing for generating a remote transfer bitmap 301 by the migrating apparatus #00 in the storage system 1 is depicted in FIG. 9.

(3-1) In the migrating apparatus #00, the data transfer status managing information generator 12 generates a first remote transfer bitmap 301a corresponding to the source volume #00 (refer to the symbol A 5). Since the source volume #00 is not a virtual volume but a normal volume, and values in the remote transfer bitmap 301 are all set to "1".

(3-2) The data transfer status managing information generator 12 generates a second remote transfer bitmap 301b corresponding to the copy bitmap #00 (refer to the symbol A 6). The data transfer controller 11 remote-transfers portions with a value "1" in the copy bitmap #00 to the destination volume #01. Thus, in the remote transfer bitmap 301, the second remote transfer bitmap 301b matches the copy bitmap #00.

(3-3) The data transfer status managing information generator 12 also generates a third remote transfer bitmap 301c corresponding to the destination volume #01 (refer to the symbol A 7). The destination volume #01 is a virtual volume (SDV), and only areas storing data are remote transferred. Thus, in the third remote transfer bitmap 301c, a value "1" is set to only areas storing data in the destination volume #01.

In the remote transfer bitmap 301, values "0" and "1" in the second remote transfer bitmap 301b are inversed in the third remote transfer bitmap 301c.

(4) Initial Copy Processing

Figure 10:
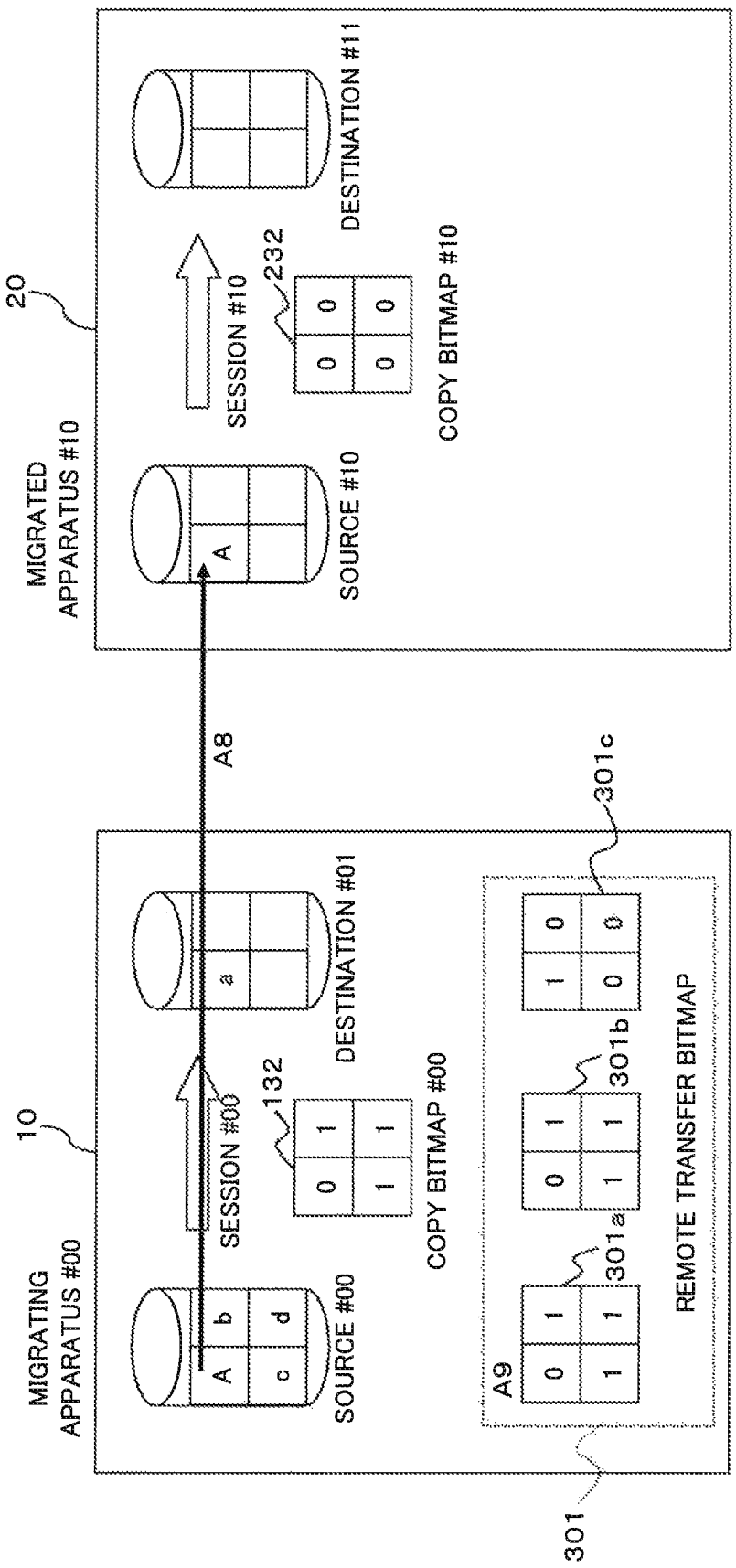
FIG. 10 is a diagram illustrating statuses of migrating and migrated apparatuses in the storage system as one example of an embodiment.

The status during initial copy processing from the migrating apparatus #00 to the migrated apparatus #10 in the storage system 1 is depicted in FIG. 10.

In the migrating apparatus #00, the data migration controller 13 searches the remote transfer bitmap 301 for areas having a value "1", and if an area having a value "1" is found, the data migration controller 13 executes a data transfer on that area for copying the data in the area to the migrated apparatus #10.

(4-1) In the migrating apparatus #00, the data migration controller 13 transfers Data A in the source volume #00, for copying it to the source volume #10 in the migrated apparatus #10, for example (refer to the symbol A 8).

(4-2) In the migrating apparatus #00, the data transfer status managing information generator 12 sets a value "0" to an area corresponding to Data A in the first remote transfer bitmap 301a (refer to the symbol A 9).

(4-3) Until a value "0 (OFF)" is set to all areas in the remote transfer bitmap 301, the processing in (4-1) and (4-2) is repeated. The initial copy processing is thereby completed.

The status upon completion of the initial copy processing from the migrating apparatus #00 to the migrated apparatus #10 in the storage system 1 is depicted in FIG. 10.

Figure 11:
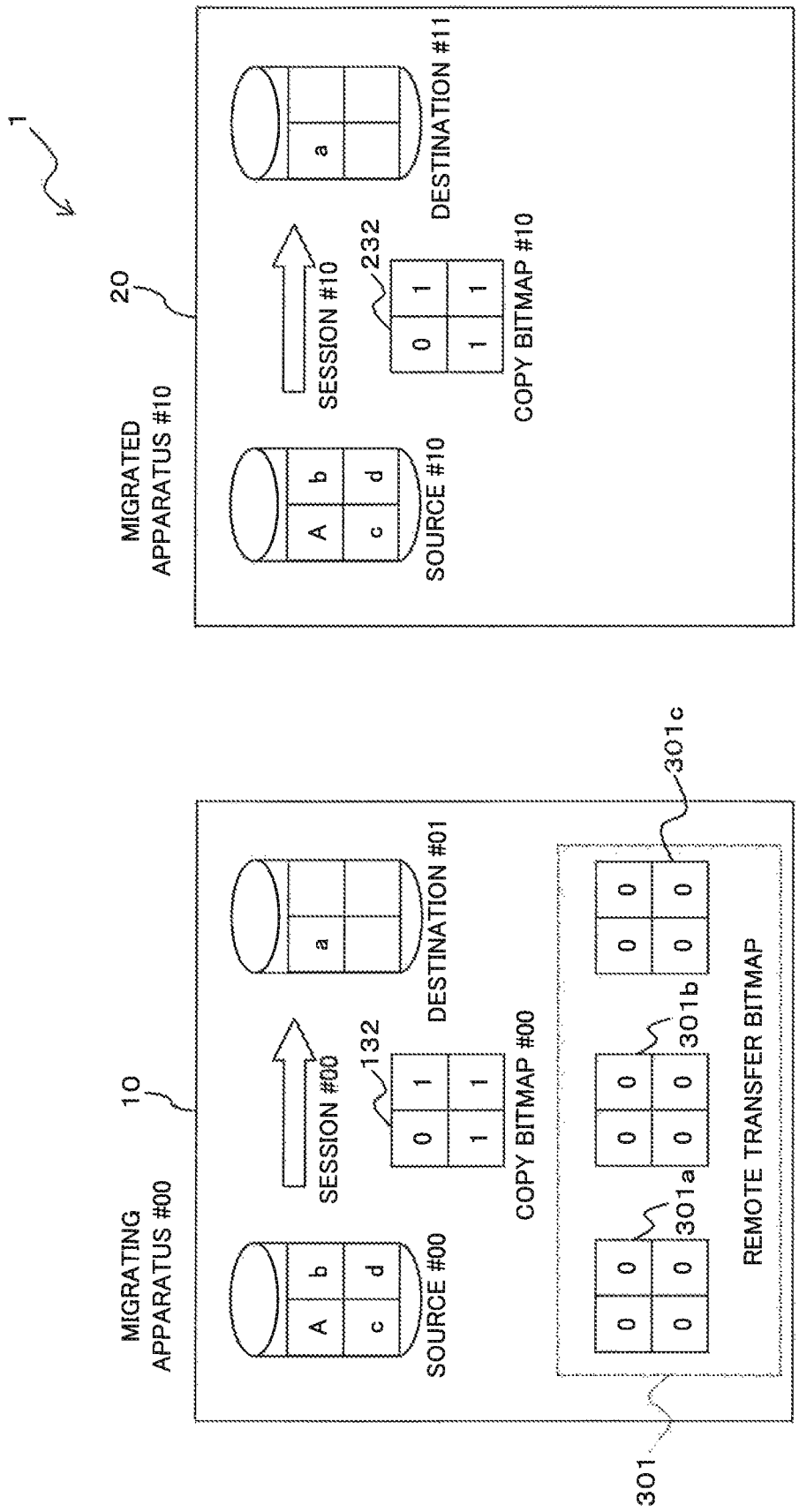
FIG. 11 is a diagram illustrating statuses of migrating and migrated apparatuses in the storage system as one example of an embodiment.

In the example depicted in FIG. 11, the source volume #10, the destination volume #11, and the copy bitmap #10 in the migrated apparatus #10 match the source volume #00, the destination volume #01, and the copy bitmap #00 in the migrating apparatus #00, respectively. A value "0" is set to all areas in the remote transfer bitmap 301.

(5) Write Processing (on Migrating Side)

The status during write processing from the migrating apparatus #00 to the migrated apparatus #10 in the storage system 1 is depicted in FIGS. 12 and 13.

For example, in response to a write request from the host apparatus 2, Data C is written to an area in the source volume #00 in the migrating apparatus #00, where Data c is written.

In the example depicted in FIG. 12, in response to a write request from the host apparatus 2, Data C is written to an area in the source volume #00 in the migrating apparatus #00, where Data c is written.

(5-1) Firstly, the data transfer controller 11 copies Data c in the source volume #00 to the destination volume #01 (refer to the symbol A 10).

(5-2) In response, the data transfer status managing information generator 12 sets a value "0" to a portion in the copy bitmap #00 corresponding to the area of Data c (refer to the symbol A 11).

(5-3) Data C is written to the source volume #00 (refer to the symbol A 12).

(5-4) The data migration controller 13 stores Data C in the source volume #00 to Generation 1 in a REC buffer 121a that is active (refer to the symbol A 13).

The similar processing is also executed when write processing is made to a certain area in the source volume #00 in the migrating apparatus #00, in response to a write request from the host apparatus 2, for example.

In the example depicted in FIG. 13, in response to a write request from the host apparatus 2, Data D is written to an area in the source volume #00 in the migrating apparatus #00, where Data d is written.

(5-5) The data transfer controller 11 copies Data d in the source volume #00 to the destination volume #01 (refer to the symbol A 14).

(5-6) In response, the data transfer status managing information generator 12 sets a value "0" to a portion in the copy bitmap #00 corresponding to the area of Data d (refer to the symbol A 15).

(5-7) Data D is written to the source volume #00 (refer to the symbol A 16).

(5-8) The data migration controller 13 stores Data D in the source volume #00 to Generation 1 in the REC buffer 121a (refer to the symbol A 17).

(6) Write Processing (REC Buffer Control)

Figure 14:
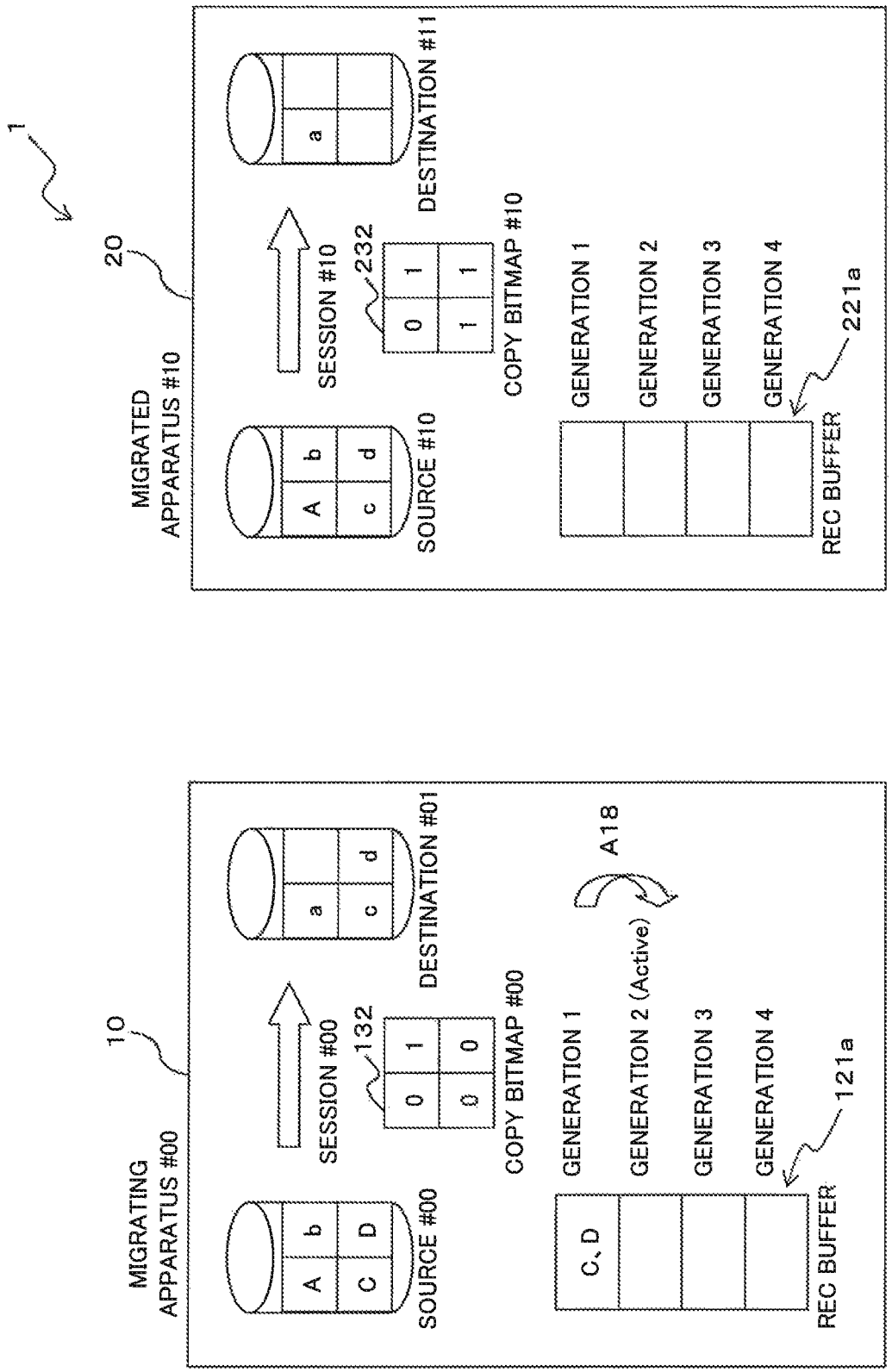
FIG. 14 is a diagram illustrating statuses of migrating and migrated apparatuses in the storage system as one example of an embodiment.

The status during switching generations of REC buffers 121a in the migrating apparatus #00 in the storage system 1 is depicted in FIG. 14.

If a free area in any of generations of the REC buffer 121a in the migrating apparatus #00 becomes depleted, the data migration controller 13 switches the REC buffer 121a in the active generation to a subsequent generation.

For example, if a free area in Generation 1 of the REC buffer 121a in the migrating apparatus #00 becomes depleted, the data migration controller 13 switches the REC buffer 121a in the active generation to a subsequent generation, i.e., Generation 2 (refer to the symbol A 18).

(7) Write Processing (on Migrating Side)

A case will be described wherein, in response to a further write request from the host apparatus 2, Data B is written to an area in the source volume #00 in the migrating apparatus #00, where Data b is written.

Figure 15:
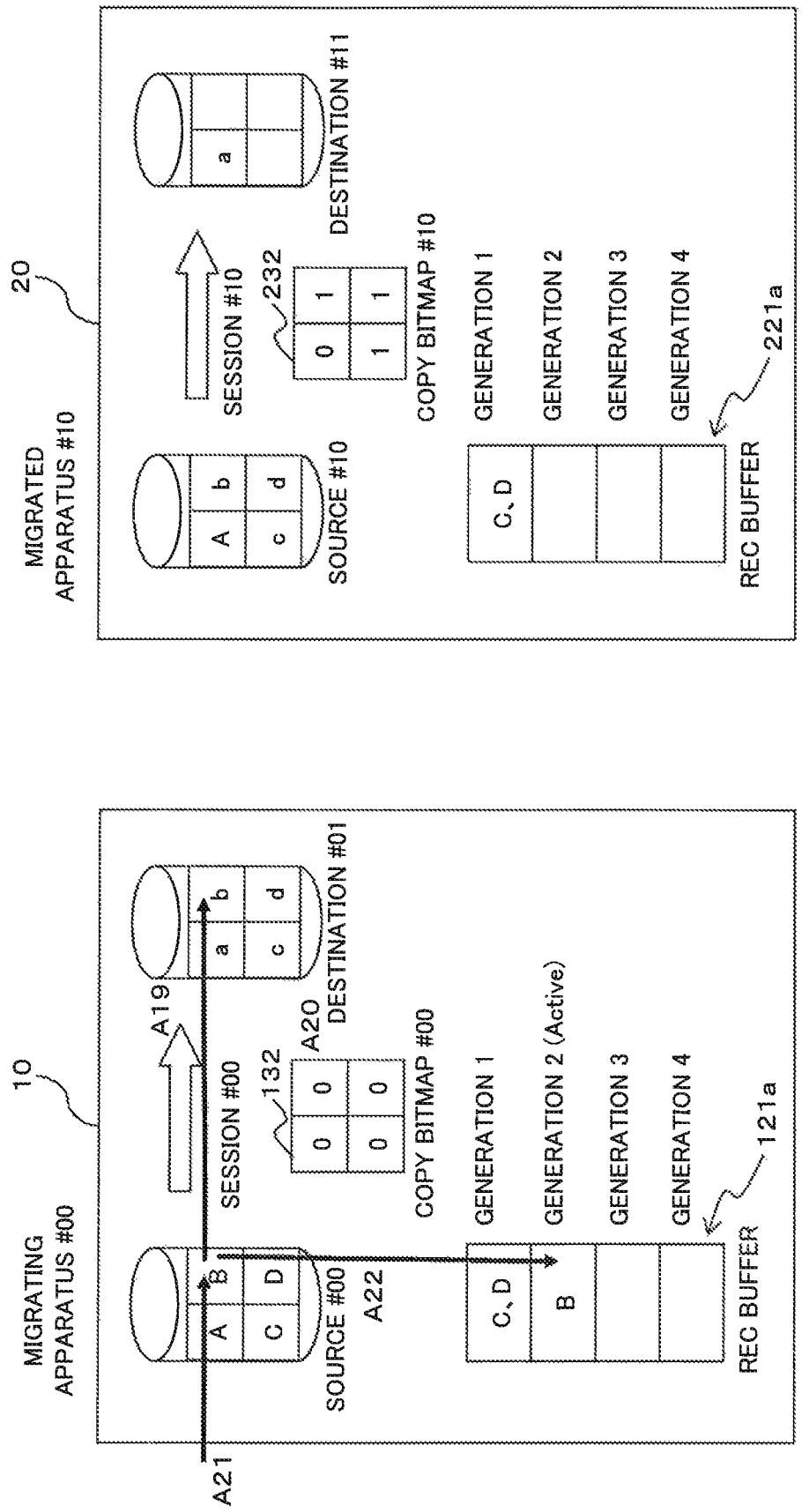
FIG. 15 is a diagram illustrating statuses of migrating and migrated apparatuses in the storage system as one example of an embodiment.

In the example depicted in FIG. 15, in response to a write request from the host apparatus 2, Data B is written to an area in the source volume #00 in the migrating apparatus #00, where Data b is written.

(7-1) The data transfer controller 11 copies Data b in the source volume #00 to the destination volume #01 (refer to the symbol A 19).

(7-2) In response, the data transfer status managing information generator 12 sets a value "0" to a portion in the copy bitmap #00 corresponding to the area of Data b (refer to the symbol A 20).

(7-3) Data B is written to the source volume #00 (refer to the symbol A 21).

(7-4) The data migration controller 13 stores Data B in the source volume #00 to Generation 2 in the REC buffer 121a (refer to the symbol A 22).

(8) Write Processing (REC Buffer Control)

The data migration controller 13 transfers data in the REC buffer 121a, for which the generations have been switched.

Figure 16:
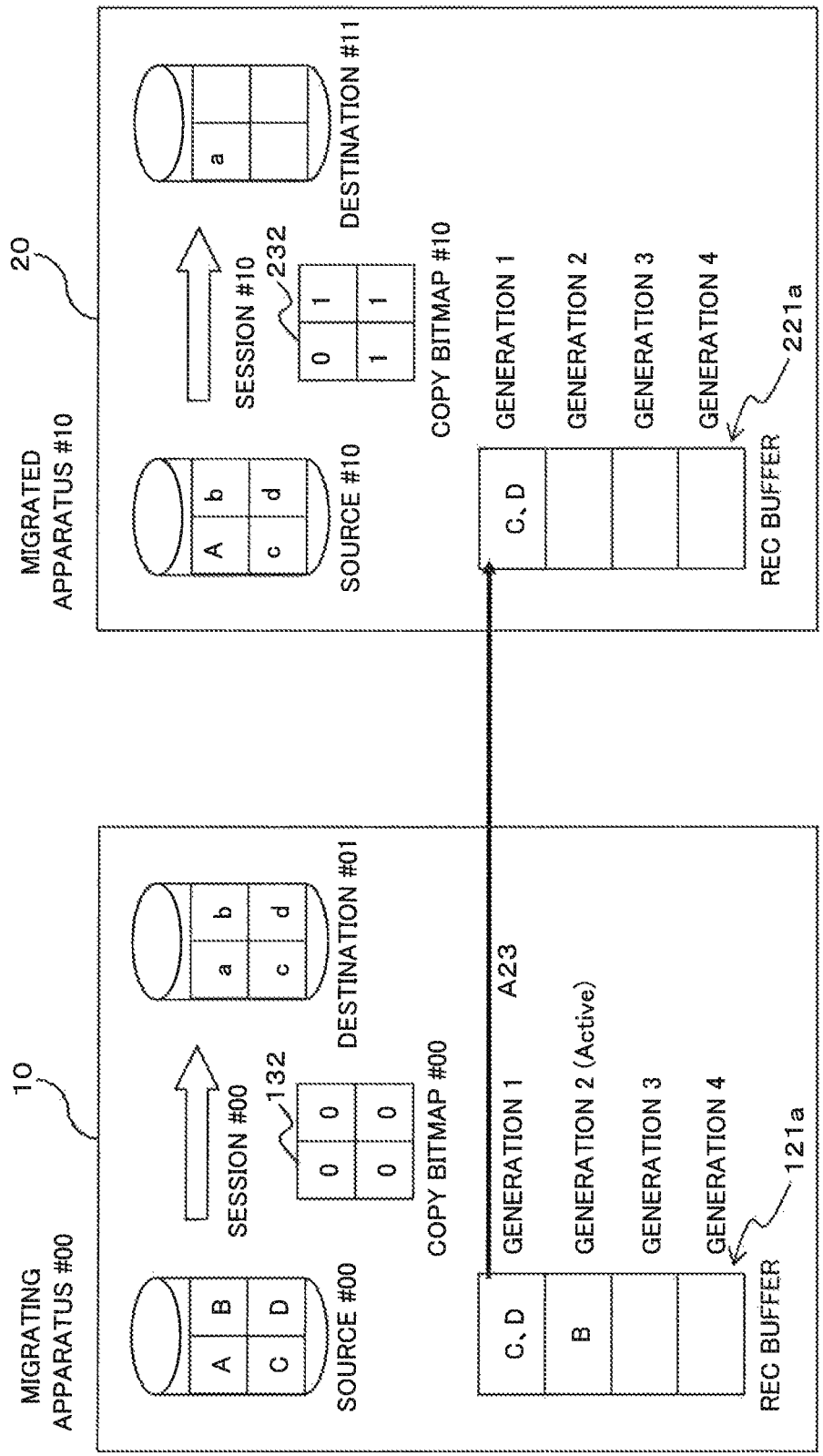
FIG. 16 is a diagram illustrating statuses of migrating and migrated apparatuses in the storage system as one example of an embodiment.

The status where data in the REC buffer 121a is transferred from the migrating apparatus #00 to the migrated apparatus #10 in the storage system 1 is depicted in FIG. 16.

The data migration controller 13 transfers data in Generation 1 of the REC buffer 121a in the migrating apparatus #00 to the migrated apparatus #10, thereby making the data in Generation 1 to Generation 1 of the REC buffer 221a (refer to the symbol A 23).

At the same time, the data migration controller 13 also transfers the REC buffer control table 202 corresponding to Generation 1 of the REC buffer 121a, to the migrated apparatus #10.

(9) Write Processing (on Migrated Side)

In the migrated apparatus #10, received write data is archived to the REC buffer 221a.

Figure 17:
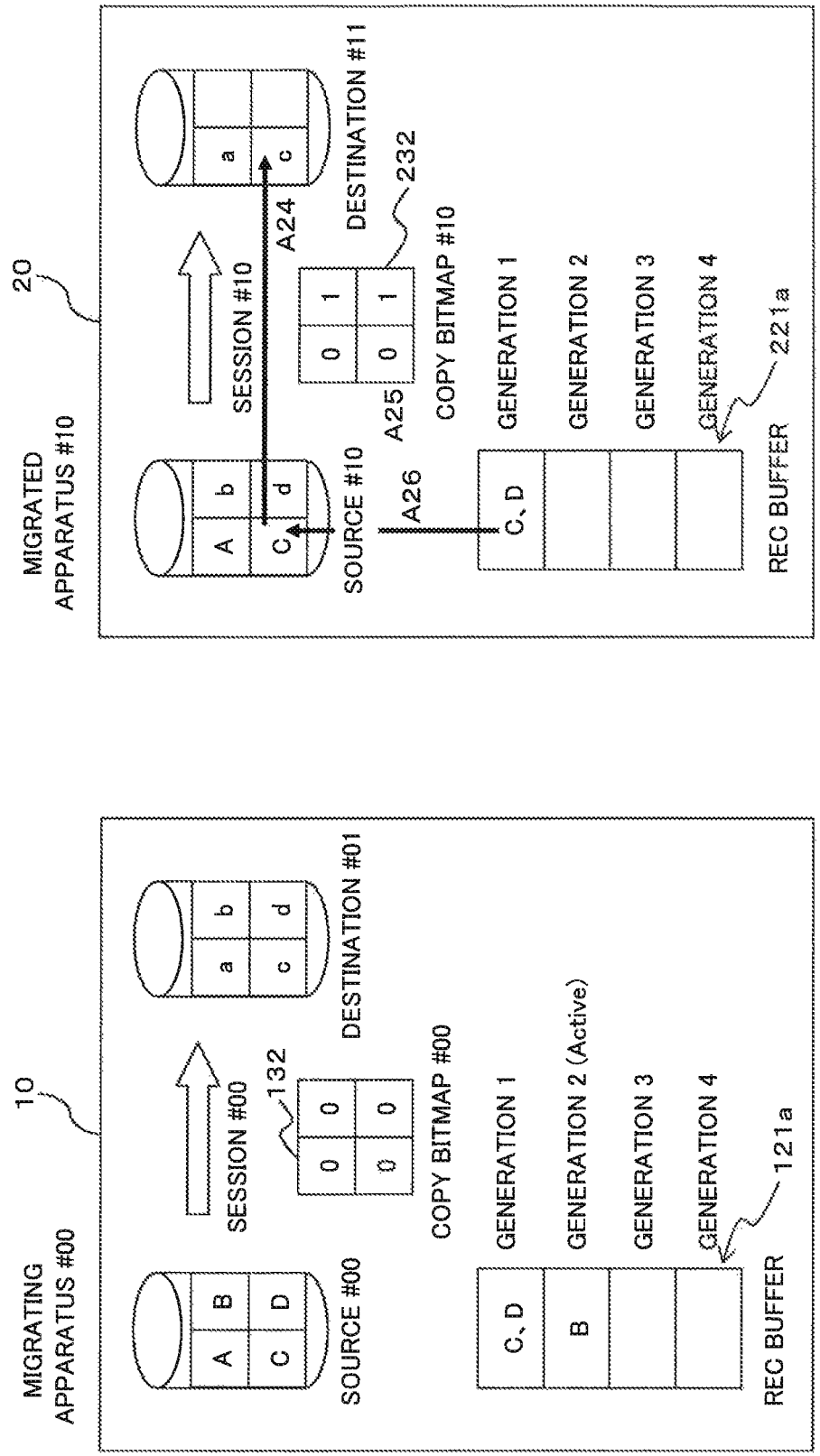
FIG. 17 is a diagram illustrating statuses of migrating and migrated apparatuses in the storage system as one example of an embodiment.

The status upon processing for the REC buffer 221a by the migrated apparatus #10 in the storage system 1 is depicted in FIG. 17.

In FIG. 17, in the migrated apparatus #10, Data C is extracted from the REC buffer 221a and is written to an area in the source volume #10 in the migrated apparatus #10, where Data c is written.

Further, write processing of the data extracted from the REC buffer 221a to the source volume #10 in the migrated apparatus #10 is executed similarly to the write processing of data to the source volume #00 in the migrating apparatus #00. The detailed processing will be described below.

(9-1) In the migrated apparatus #10, the data transfer controller 21 copies Data c in the source volume #00 to the destination volume #01 (refer to the symbol A 24).

(9-2) In response, the volume session generator sets a value "0" to a portion in the copy bitmap #10 corresponding to the area of Data c (refer to the symbol A 25).

(9-3) Data C read from the REC buffer 221a is written to the source volume #10 (refer to the symbol A 26).

Thereafter, in the migrated apparatus #10, data D in Generation 1 of the REC buffer 221a is also written to the source volume #10.

Figure 18:
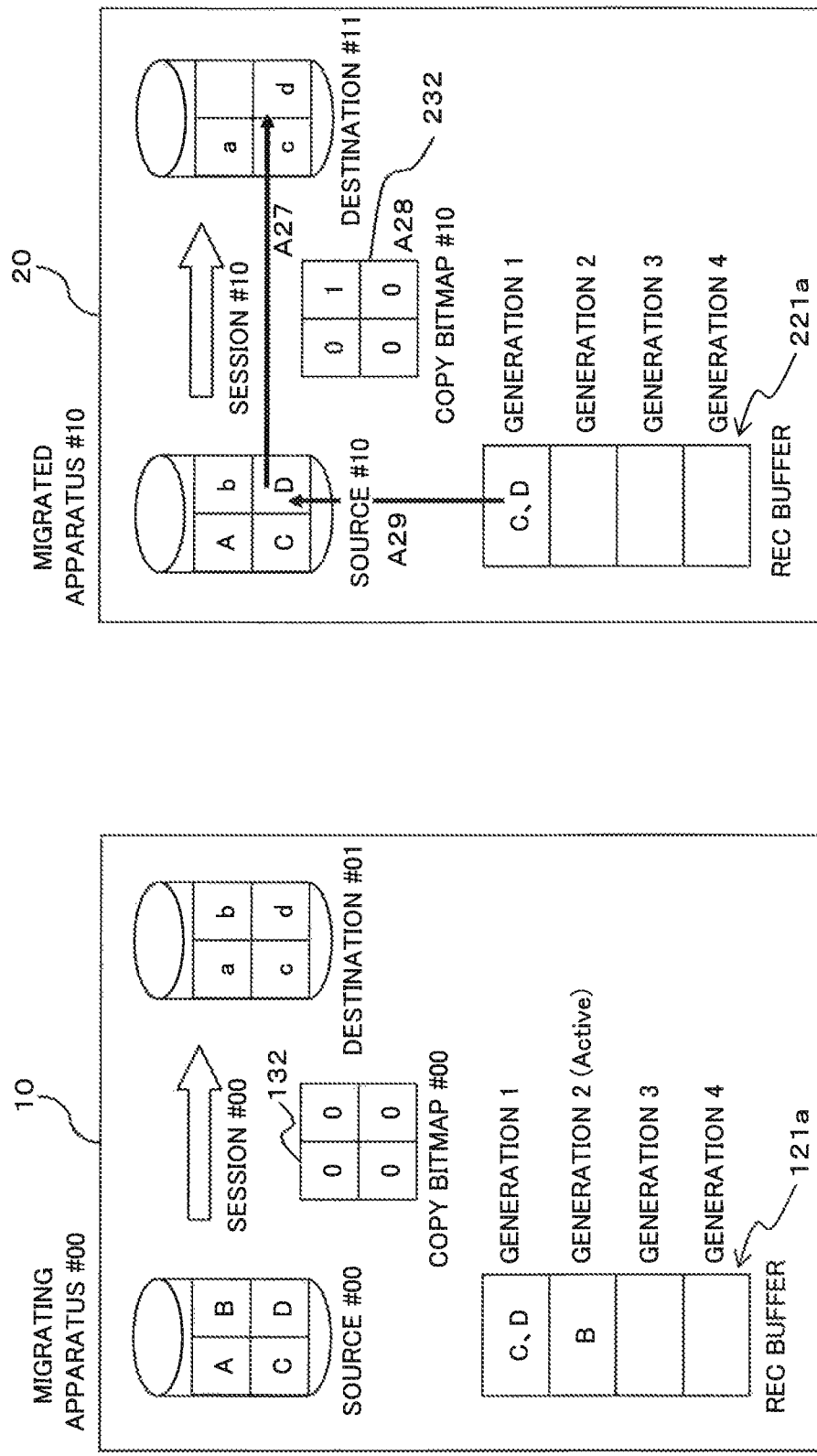
FIG. 18 is a diagram illustrating statuses of migrating and migrated apparatuses in the storage system as one example of an embodiment.

In FIG. 18, an example is described wherein, in the migrated apparatus #10, Data D is extracted from the REC buffer 221a and is written to an area in the source volume #10 in the migrated apparatus #10, where Data d is written.

(9-4) In the migrated apparatus #10, the data transfer controller 21 copies Data d in the source volume #00 to the destination volume #01 (refer to the symbol A 27).

(9-5) In response, the volume session generator sets a value "0" to a portion in the copy bitmap #10 corresponding to the area of Data d (refer to the symbol A 28).

(9-6) Data D read from the REC buffer 221a is written to the source volume #10 (refer to the symbol A 29). After the above processing is completed, the migrated apparatus #10 notifies the migrating apparatus #00 of the completion of the processing.

(10) Write Processing (REC Buffer Control)

Figure 19:
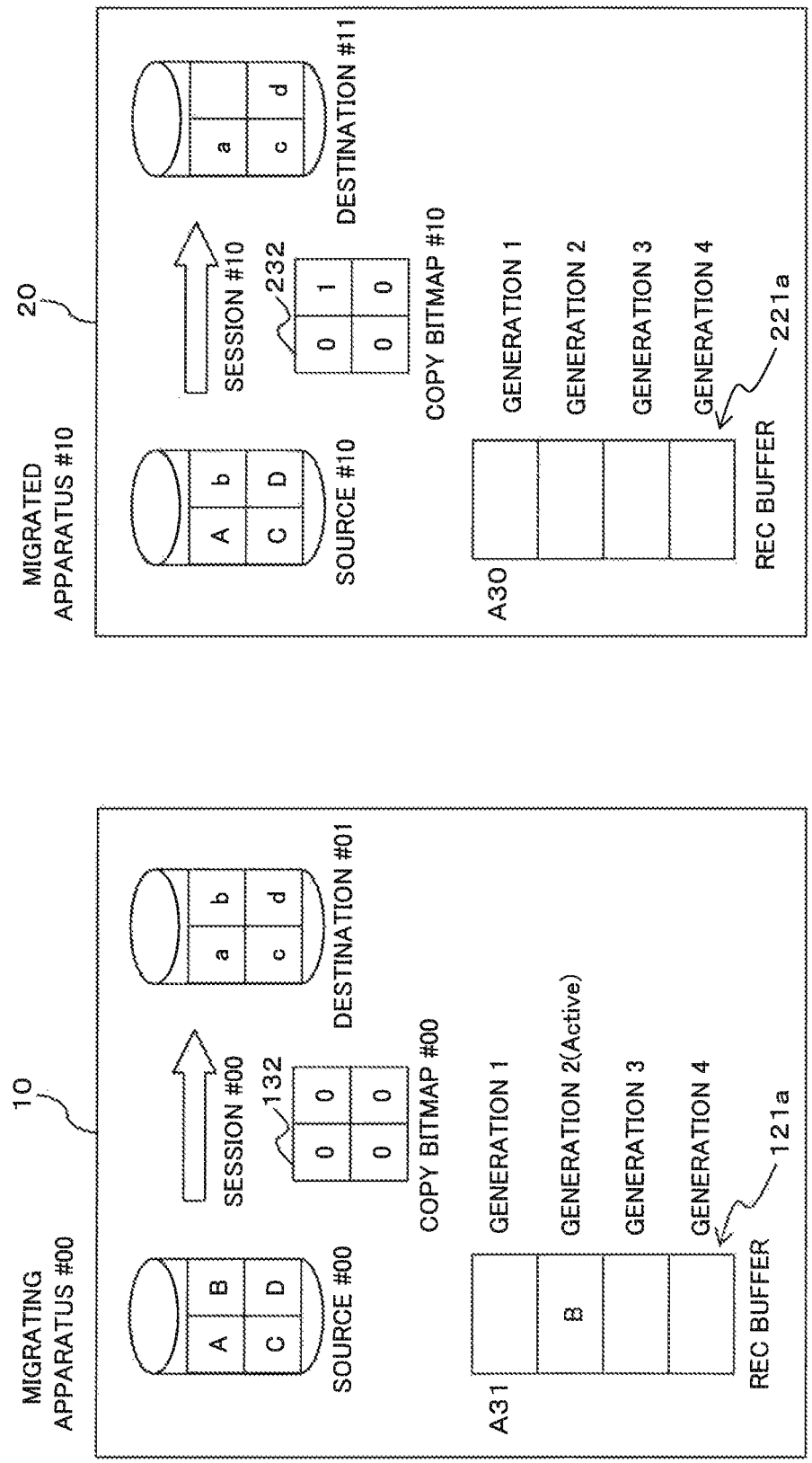
FIG. 19 is a diagram illustrating statuses of migrating and migrated apparatuses in the storage system as one example of an embodiment.

The status after archiving Generation 1 of the REC buffer 221a to the data source volume #10 in the migrated apparatus #10 in the storage system 1 is depicted in FIG. 19.

After the archive of Generation 1 of the REC buffer 221a to the data source volume #10 is completed, the following processing is executed.

(10-1) Generation 1 of the REC buffer 221a in the migrated apparatus #10 is freed up (refer to the symbol A 30).

(10-2) Generation 1 of the REC buffer 121a in the migrating apparatus #00 is freed up (refer to the symbol A 31).

(11) Write Processing (REC Buffer Control, after Elapse of Predetermined Time)

If a predetermined time elapses after any of generations of the REC buffer 121a is activated in the migrating apparatus #00, the data migration controller 13 also switches the REC buffer 121a in the active generation to a subsequent generation.

The predetermined time may be set to any suitable value by a user. Preferably, the predetermined time ranges from one second to several minutes, for example.

Figure 20:
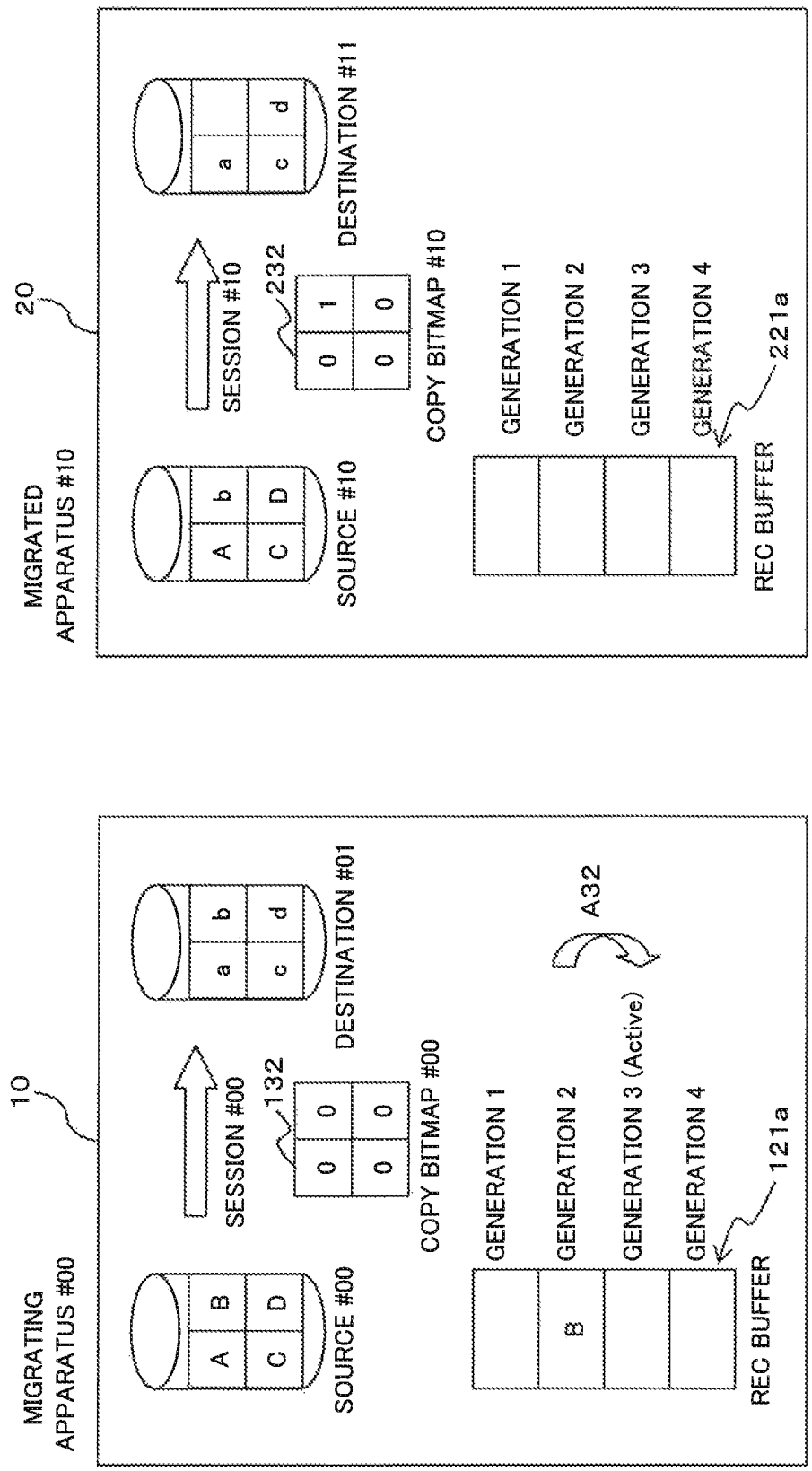
FIG. 20 is a diagram illustrating statuses of migrating and migrated apparatuses in the storage system as one example of an embodiment.

In the example depicted in FIG. 20, in the migrating apparatus #00 in the storage system 1, a predetermined time elapses after Generation 2 of the REC buffer 121a is activated.

When a lapse of the predetermined time from the activation of Generation 2 of the REC buffer 121a is detected in the migrating apparatus #00, the data migration controller 13 switches an active generation of the REC buffer 121a from Generation 2 to Generation 3 (refer to the symbol A 32).

(12) Write Processing (REC Buffer Control)

Further, in response to switching of the generation of the REC buffer 121a in the migrating apparatus #00, the data migration controller 13 transfers data in the newly activated generation of the REC buffer 121a to the migrated apparatus #10, for storing it to the corresponding generation of the REC buffer 221a.

Figure 21:
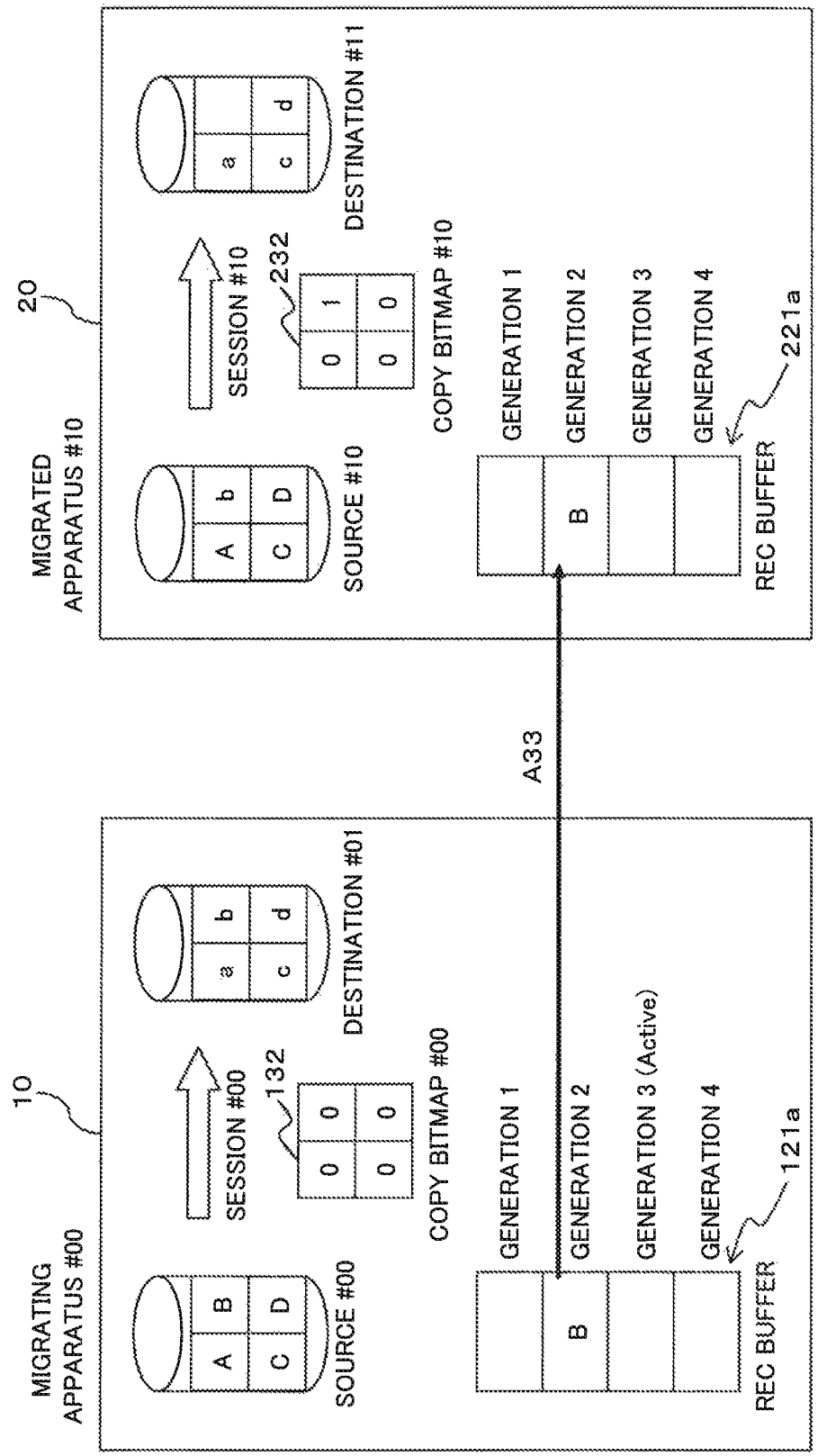
FIG. 21 is a diagram illustrating statuses of migrating and migrated apparatuses in the storage system as one example of an embodiment.

In the example depicted in FIG. 21, in the migrating apparatus #00 in the storage system 1, the active generation of the REC buffer 121a is activated from Generation 2 to Generation 3.

The data migration controller 13 transfers data in Generation 2 of the REC buffer 121a in the migrating apparatus #00 to the migrated apparatus #10, thereby making the data in Generation 2 to Generation 2 of the REC buffer 221a (refer to the symbol A 33).

At the same time, the data migration controller 13 also transfers the REC buffer control table 202 corresponding to Generation 2 of the REC buffer 121a, to the migrated apparatus #10.

(13) Write Processing (on Migrated Side)

In the migrated apparatus #10, received write data is archived to Generation 2 of the REC buffer 221a.

The status upon processing for data in Generation 2 of the REC buffer 221a by the migrated apparatus #10 in the storage system 1 is depicted in FIG. 22.

In FIG. 22, in the migrated apparatus #10, Data B is extracted from Generation 2 of the REC buffer 221a and is written to an area in the source volume #10 in the migrated apparatus #10, where Data b is written.

Further, write processing of the data extracted from Generation 2 of the REC buffer 221a to the source volume #10 in the migrated apparatus #10 is also executed similarly to the write processing of data to the source volume #00 in the migrating apparatus #00. The detailed processing will be described below.

(13-1) In the migrated apparatus #10, the data transfer controller 21 copies Data b in the source volume #00 to the destination volume #01 (refer to the symbol A 34).

(13-2) In response, the volume session generator sets a value "0" to a portion in the copy bitmap #10 corresponding to the area of Data b (refer to the symbol A 35).

(13-3) Data B read from Generation 2 of the REC buffer 221a is written to the source volume #10 (refer to the symbol A 36).

(14) Write Processing (REC Buffer Control)

The status after archiving Generation 1 of the REC buffer 221a to the data source volume #10 in the migrated apparatus #10 in the storage system 2 is depicted in FIG. 23.

After the archiving of Generation 2 of the REC buffer 221a to the data source volume #10 is completed, the following processing is executed.

(14-1) Generation 2 of the REC buffer 221a in the migrated apparatus #10 is freed up (refer to the symbol A 37).

(14-2) Generation 2 of the REC buffer 121a in the migrating apparatus #00 is freed up (refer to the symbol A 38).

Next, processing in the storage system 1 as one example of an embodiment will be explained with reference to the flowcharts depicted in FIGS. 24-28.

Figure 24:
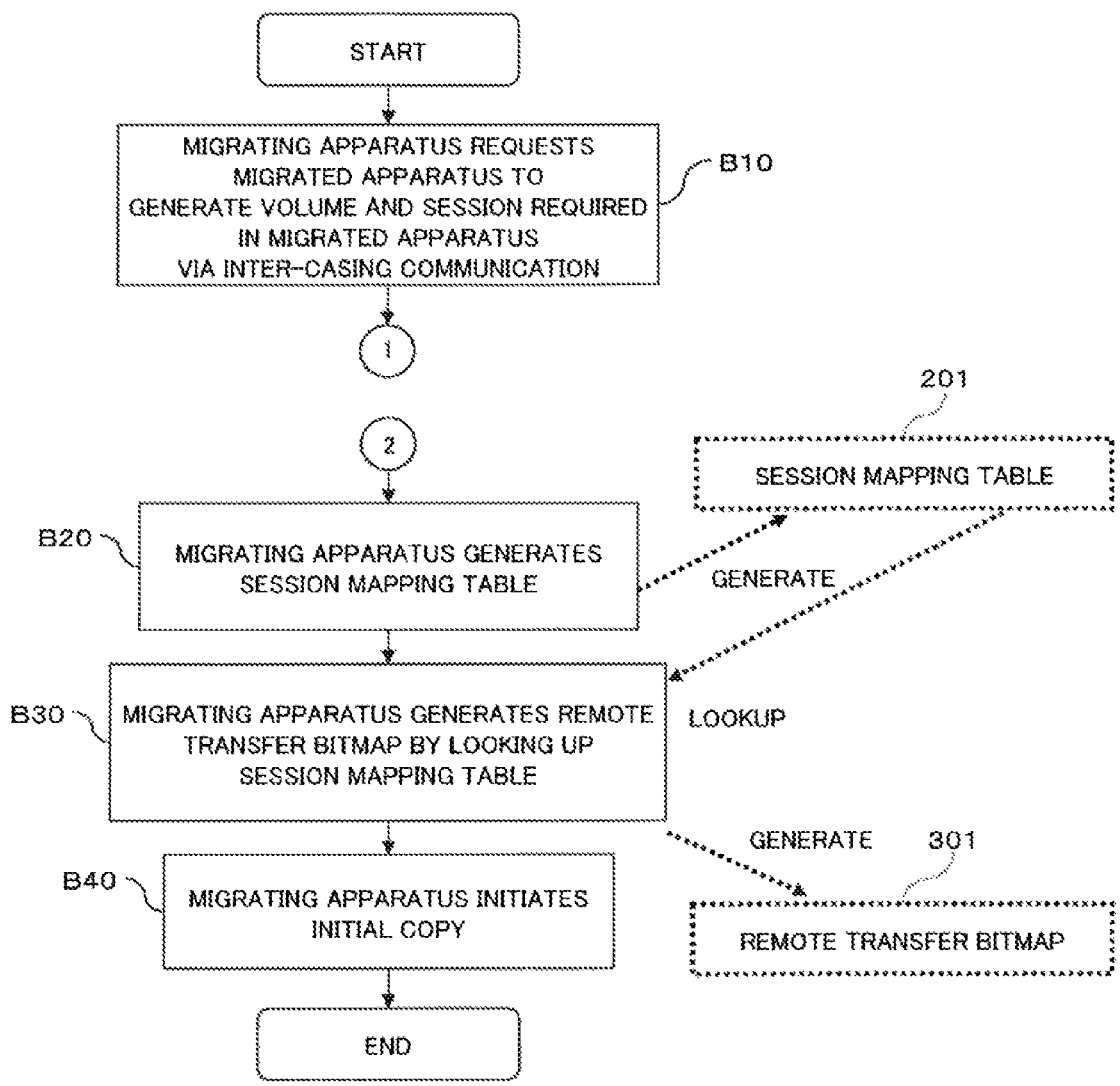
FIG. 24 is a flowchart illustrating volume session generation processing in a migrating apparatus in the storage system as one example of an embodiment.
Figure 25:
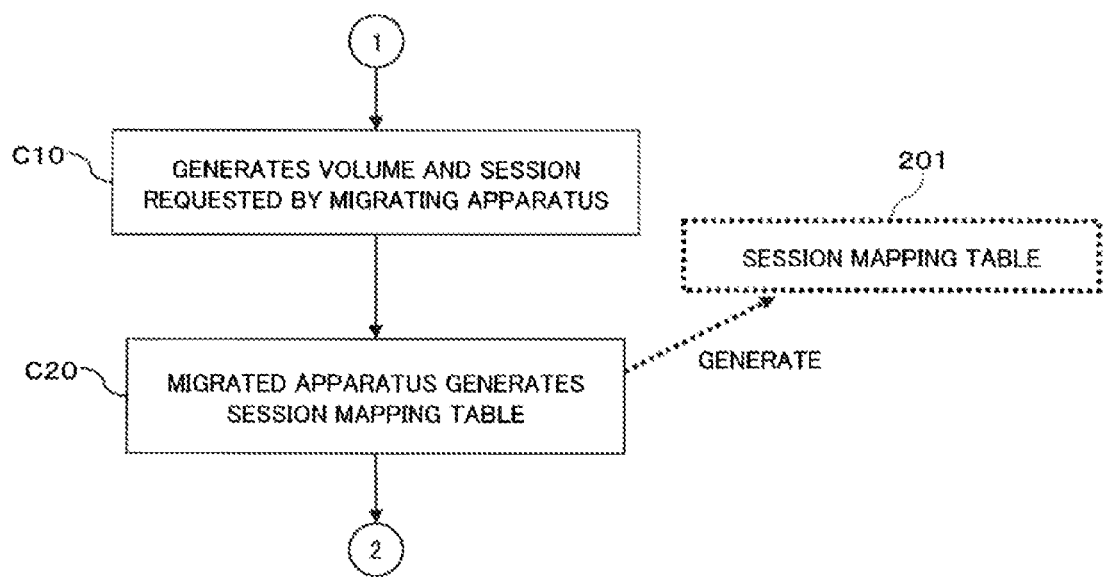
FIG. 25 is a flowchart illustrating volume session generation processing in a migrated apparatus in the storage system as one example of an embodiment.

FIG. 24 is a flowchart illustrating volume session generation processing in a migrating apparatus #00 in the storage system 1 (Steps B 10 to B 40). FIG. 25 is a flowchart illustrating volume session generation processing in a migrated apparatus #10 in the storage system 1 (Steps C 10 to C 20).

Firstly, the migrating apparatus #00 requests the migrated apparatus #10 to generates a volume required in the migrated apparatus #10 and a copy session, via an inter-enclosure processing through the remote line 50 (Step B 10 in FIG. 24).

In the migrated apparatus #10, the volume session generator 23 generates a volume and a copy session, based on the request from the migrating apparatus #00. In the present embodiment, the volume session generator 23 generates a source volume #10, a destination volume #11, and a copy bitmap #10 (Step C 10 in FIG. 25).

Further, in the migrated apparatus #10, the session mapping table generator 22 generates a session mapping table 201 (Step C 20 in FIG. 25).

In the migrating apparatus #00, the session mapping table generator 14 generates a session mapping table 201 (Step B 20 in FIG. 24).

In this manner, by generating the session mapping table 201 and the session mapping table 201 in the migrated apparatus #10 and the migrating apparatus #00, any mismatch between them may be detected and any error in the system may be detected. Stated differently, the reliability of the session mapping tables 201 and 201 may be improved.

Note that either the session mapping table generator 22 in the migrated apparatus #10 or the session mapping table generator 14 in the migrating apparatus #00 may generate a single session mapping table, and the generated session mapping table may be shared between the migrating apparatus #00 and the migrated apparatus #10. Any other modifications may be made.

Further, in the migrating apparatus #00, the data transfer status managing information generator 12 generates a remote transfer bitmap 301, based on the session mapping table 201 (Step B 30 in FIG. 24).

Thereafter, the migrating apparatus #00 initiates an initial copy (Step B 40 in FIG. 24).

Figure 26:
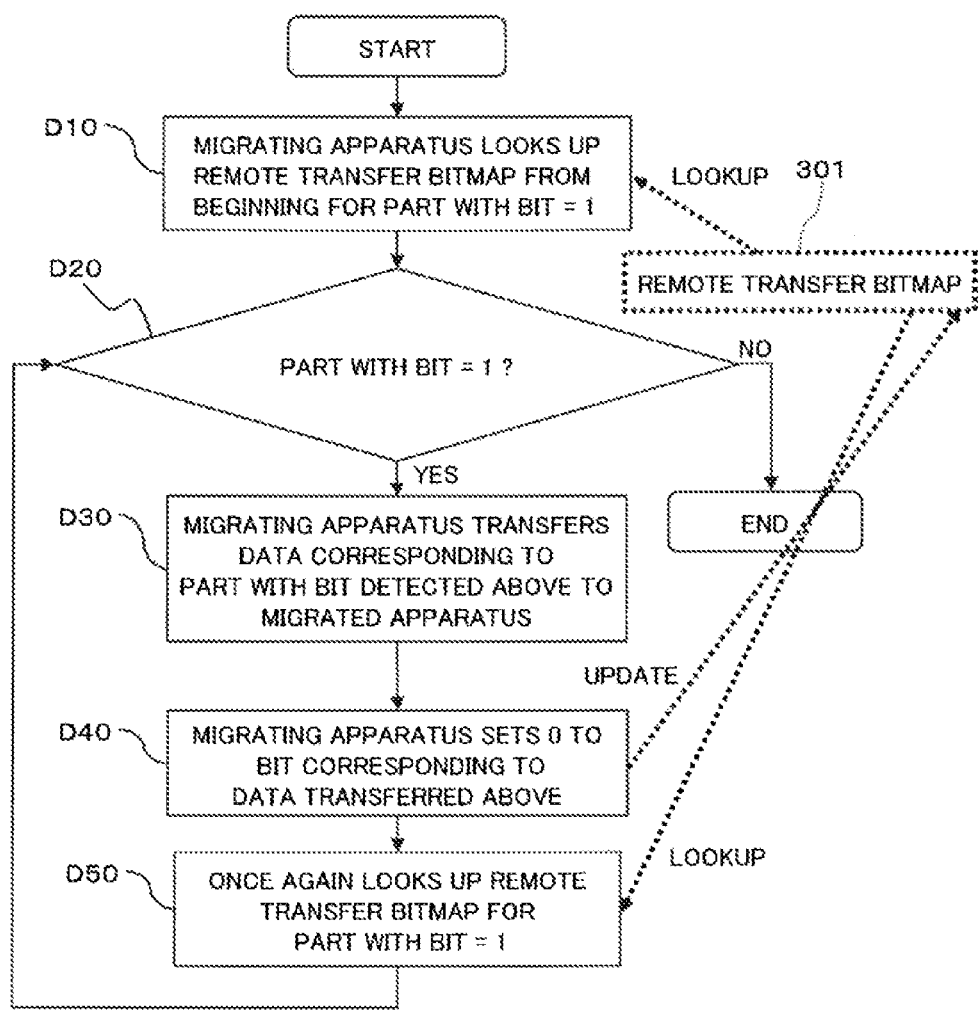
FIG. 26 is a flowchart illustrating volume session generation processing in a migrated apparatus in the storage system as one example of an embodiment.

FIG. 26 is a flowchart illustrating initial copy processing in the migrating apparatus #00 in the storage system 1 (Steps D 10 to D 50).

In the migrating apparatus #00, the data migration controller 13 searches the remote transfer bitmap 301 from the beginning, for any portions with a bit "1" (Step D 10).

The data migration controller 13 determines whether or not there is any portion with a bit "1" in the remote transfer bitmap 301 (Step D 20). If there is no portion with a bit "1" in the remote transfer bitmap 301 (refer to the No route from Step D 20), the data migration controller 13 determines that no remote transfer is required for copy and terminates the processing.

Otherwise, if there is a portion with a bit "1" in the remote transfer bitmap 301 (refer to the Yes route from Step D 20), the data migration controller 13 transfers the data corresponding to the bit "1" to the migrated apparatus #10 together with specifying the area for storing the data (Step D 30).

In the migrated apparatus #10 to which the data is transferred, the received data is stored in the area specified by the data migration controller 13 in the migrating apparatus #00. In other words, the volume and the copy bitmap #10 generated by the volume session generator 23 are updated with the received data.

Further, in the migrating apparatus #00, the data transfer status managing information generator 12 updates the bit in the remote transfer bitmap 301 corresponding to the data transferred in Step D 30 by setting a value of "0" (Step D 40).

Thereafter, in the migrating apparatus #00, the data migration controller 13 searches the remote transfer bitmap 301 from the beginning, for any portions with a bit "1" once again (Step D 50), and returns to Step D 20.

Figure 27:
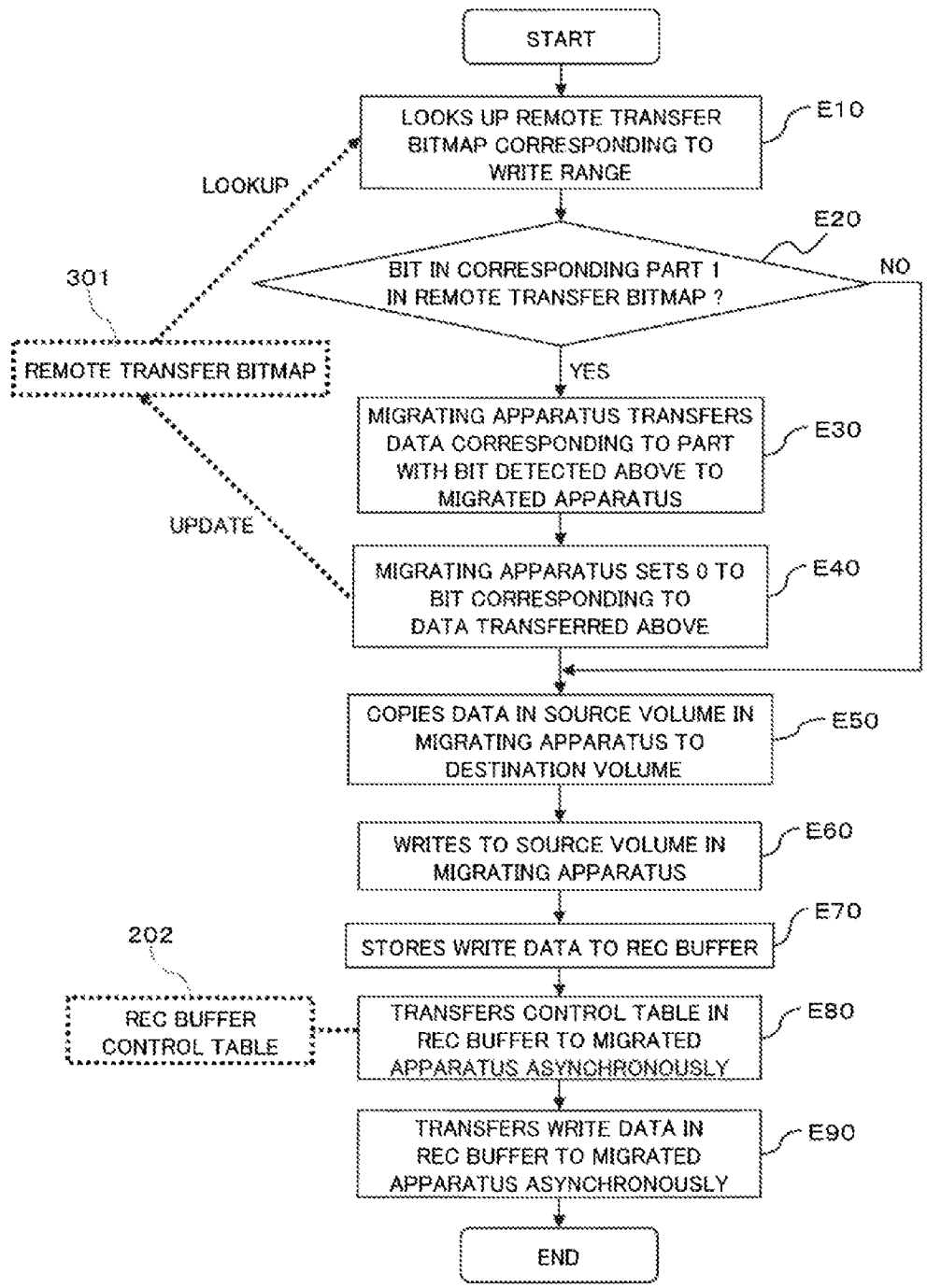
FIG. 27 is a flowchart illustrating write processing in a migrating apparatus in the storage system as one example of an embodiment.

FIG. 27 is a flowchart illustrating write processing in the storage system 1 (Steps E 10 to E 90).

For example, a data write request to the source volume #00 in the migrating apparatus #00 is made from the host apparatus 2.

In the migrating apparatus #00, the data transfer status managing information generator 12 checks the remote transfer bitmap 301 (Step E 10), and determines whether the value of the bit in the area to which the data is written for the write request from the host apparatus 2 is "1" (Step E 20). In other words, the data transfer status managing information generator 12 checks whether or not an initial copy has been completed for data in the area to which a write request was made from the host apparatus 2, in the migrating apparatus #00.

If the bit for area to which data related to the write request from the host apparatus 2 is written is "1" in the remote transfer bitmap 301 (refer to the Yes route from Step E 20), the migrating apparatus #00 transfers data corresponding to the area which is detected to have a value of "1" by the data migration controller 13 in Step E 20, to the migrated apparatus #10 (Step E 30).

Then in the migrating apparatus #00, the data transfer status managing information generator 12 sets a value "0" the remote transfer bitmap 301, to the bit corresponding to the data which was transferred in Step E 30 (Step E 40).

In this manner, in the storage system 1, if a write request is made for an area to which an initial copy in the source volume #00 in the migrating apparatus #00 has not been completed from the host apparatus 2, an initial copy is executed in Steps E 30 and E 40 before writing the data. This may help to assure the data integrity, thereby improving the reliability.

Otherwise, if the bit for area to which data related to the write request from the host apparatus 2 is written is not "1" in the remote transfer bitmap 301 (refer to the No route from Step E 20), the data in the area in the source volume #00 in the migrating apparatus #00 is transferred to the migrated apparatus #10, to copy it to a corresponding area in the destination volume #01 (Step E 50).

Then, the data related to the write request from the host apparatus 2 is written to the source volume #00 in the migrating apparatus #00 (Step E 60), and the data is stored to the REC buffer 121a (Step E 70).

In the migrating apparatus #00, the data migration controller 13 transfers a REC buffer control table 202 corresponding to write data, to the migrated apparatus #10 (Step E 80). The data migration controller 13 then asynchronously sends the write data to the migrated apparatus #10 (Step E 90), and terminates the processing.

Figure 28:
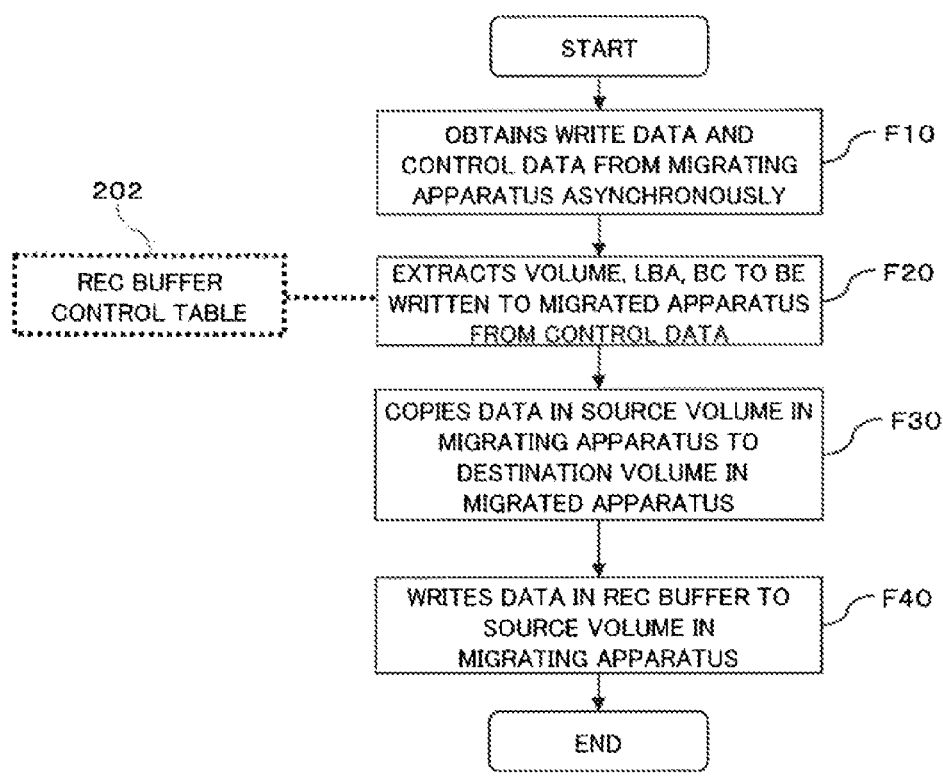
FIG. 28 is a flowchart illustrating write processing in a migrated apparatus in the storage system as one example of an embodiment.

FIG. 28 is a flowchart illustrating write processing in a migrated apparatus #10 in the storage system 1 (Steps F 10 to F 40).

The migrated apparatus #10 obtains, write data and the corresponding control data (REC buffer control table 202) asynchronously from the migrating apparatus #00 (Step F 10).

Further, the migrated apparatus #10 extracts information, such as a write to be written, the LBA, and the BC, from the REC buffer control table 202 (Step F 20).

Then, in the migrated apparatus #10, the data transfer controller 21 copies data in the area for writing in the source volume #10, to the corresponding area in the destination volume #11 (Step F 30).

Thereafter, in the migrating apparatus #00, the data in the REC buffer 221a is written to the source volume #10 (Step F 40), and the processing is terminated.

As described above, in accordance with the storage system 1 as an embodiment of the present disclosure, the source volume #00 in the migrating apparatus #00, the destination volume #01, and the copy bitmap #00 (session information) are transferred to the migrated apparatus #10, based on the remote transfer bitmap 301.

Hence, the status of the progress of a copy from the source volume #00 to the destination volume #01 in the migrating apparatus #00 may be reproduced in the migrated apparatus #10 after the data migration, which is quite convenient.

In conventional techniques, for migrating data in a destination volume #01 constructed as a virtual volume (SDV), which is a destination of SnapOPC+, the size same as that of the actual data in the source volume #00 is required in the migrated apparatus #10.

Hence, in the conventional technique, if snap shots of multiple generations are created by SnapOPC+, for example, a larger disk space is required and the required disk space is increased as the generation count increases.

In contrast, in accordance with the disclosed technique, in a migrated apparatus #10, a virtual volume may be employed as a destination volume #11 corresponding to a destination volume #01M. Thereby, the actual disk space may be reduced.

The disclosed technique is not limited to the embodiment described above, and various modifications may be made without departing from the spirit of the present embodiment.

In accordance with the present disclosure, the data transfer status between multiple storing units in a migrating storage apparatus may be reproduced in another migrated storage apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention

What is claimed is:

1. A storage apparatus that transfers data to a second storage apparatus connected via a network, the storage apparatus comprising:

a control module;

a first storing unit that stores source data;

a second storing unit that stores backup data corresponding to the data; and a control information storing unit that stores first data transfer status managing information for managing a data transfer status between the first storing unit and the second storing unit, wherein the control module:

controls a data transfer between the first storing unit and the second storing unit;

receives a data migration instruction for migrating data stored in the first storing unit and the second storing unit to the second storage apparatus;

generates, in response to receiving the data migration instruction, second data transfer status managing information for managing a data transfer status between the first storing unit and a third storing unit provided in the second storage apparatus, and third data transfer status managing information for managing data transfer status between the second storing unit and a fourth storing unit provided in the second storage apparatus based on the first data transfer status managing information; and transfers data between the first storing unit and the third storing unit based on the second data transfer status managing information, transfers data between the second storing unit and the fourth storing unit based on the third data transfer status managing information, and transfers the first data transfer status managing information, wherein the control module transfers the data from the first storing unit to the second storing unit using SnapOPC+.

2. A storage apparatus that transfers data to a second storage apparatus connected via a network, the storage apparatus comprising:

a control module;

a first storing unit that stores source data;

a second storing unit that stores backup data corresponding to the data; and a control information storing unit that stores first data transfer status managing information for managing a data transfer status between the first storing unit and the second storing unit, wherein the control module:

controls a data transfer between the first storing unit and the second storing unit;

receives a data migration instruction for migrating data stored in the first storing unit and the second storing unit to the second storage apparatus;

generates, in response to receiving the data migration instruction, second data transfer status managing information for managing a data transfer status between the first storing unit and a third storing unit provided in the second storage apparatus, and third data transfer status managing information for managing data transfer status between the second storing unit and a fourth storing unit provided in the second storage apparatus based on the first data transfer status managing information; and transfers data between the first storing unit and the third storing unit based on the second data transfer status managing information, transfers data between the second storing unit and the fourth storing unit based on the third data transfer status managing information, and transfers the first data transfer status managing information, wherein the control module transfers the data between the first storing unit and the third storing unit data, and between the second storing unit and the fourth storing unit, asynchronously with data write to the first storing unit.

3. A non-transitory computer readable recording medium having a program stored therein, the program causing a control module to execute data transfer control function to a storage apparatus comprising: a first storing unit that stores source data; a second storing unit that stores backup data corresponding to the data; a control information storing unit that stores first data transfer status managing information for managing a data transfer status between the first storing unit and the second storing unit; and a receiver that receives a data migration instruction for migrating data stored in the first storing unit and the second storing unit to the second storage apparatus, the program causing the control module to:

control a data transfer between the first storing unit and the second storing unit;

generate, in response to receiving the data migration instruction, second data transfer status managing information for managing a data transfer status between the first storing unit and a third storing unit provided in the second storage apparatus, and third data transfer status managing information for managing data transfer status between the second storing unit and a fourth storing unit provided in the second storage apparatus based on the first data transfer status managing information; and transfer data between the first storing unit and the third storing unit based on the second data transfer status managing information, transfer data between the second storing unit and the fourth storing unit based on the third data transfer status managing information, and transfer the first data transfer status managing information, wherein the data transfer from the first storing unit to the second storing unit is executed using SnapOPC+.

4. A non-transitory computer readable recording medium having a program stored therein, the program causing a control module to execute data transfer control function to a storage apparatus comprising: a first storing unit that stores source data; a second storing unit that stores backup data corresponding to the data; a control information storing unit that stores first data transfer status managing information for managing a data transfer status between the first storing unit and the second storing unit; and a receiver that receives a data migration instruction for migrating data stored in the first storing unit and the second storing unit to the second storage apparatus, the program causing the control module to:

control a data transfer between the first storing unit and the second storing unit;

generate, in response to receiving the data migration instruction, second data transfer status managing information for managing a data transfer status between the first storing unit and a third storing unit provided in the second storage apparatus, and third data transfer status managing information for managing data transfer status between the second storing unit and a fourth storing unit provided in the second storage apparatus based on the first data transfer status managing information; and transfer data between the first storing unit and the third storing unit based on the second data transfer status managing information, transfer data between the second storing unit and the fourth storing unit based on the third data transfer status managing information, and transfer the first data transfer status managing information, wherein the data transfer between the first storing unit and the third storing unit data, and between the second storing unit and the fourth storing unit, is executed asynchronously with data write to the first storing unit.

\* \* \* \* \*